United States Patent
Yahata et al.

(10) Patent No.: US 6,969,413 B2
(45) Date of Patent: Nov. 29, 2005

(54) EXHAUST GAS FILTERING SYSTEM HAVING PARTICULATE FILTER FOR INTERNAL COMBUSTION ENGINE

(75) Inventors: Shigeto Yahata, Kariya (JP); Makoto Saito, Okazaki (JP); Tsukasa Kuboshima, Okazaki (JP); Shinichiro Okugawa, Toyota (JP); Masumi Kinugawa, Okazaki (JP)

(73) Assignee: Denso Corporation, Kariya (JP)

( * ) Notice: Subject to any disclaimer, the term of this patent is extended or adjusted under 35 U.S.C. 154(b) by 215 days.

(21) Appl. No.: 10/459,556

(22) Filed: Jun. 12, 2003

(65) Prior Publication Data

US 2003/0230060 A1 Dec. 18, 2003

(30) Foreign Application Priority Data

Jun. 13, 2002 (JP) .............................. 2002-173095
Nov. 7, 2002 (JP) .............................. 2002-323591

(51) Int. Cl.[7] ......................... B01D 46/00; B01D 46/46
(52) U.S. Cl. ...................... 55/282.3; 55/385.3; 55/523; 55/DIG. 10; 55/DIG. 30; 96/420; 96/421; 96/422; 96/423; 95/1; 95/8; 95/12; 95/14; 95/15; 95/19; 95/20; 95/22; 95/23; 60/311
(58) Field of Search ........................... 55/282.2, 282.3, 55/385.1, 523, DIG. 10, DIG. 30, 385.3; 96/420, 421, 422, 423; 95/1, 8, 12, 14, 15, 95/19, 20, 22, 23; 60/34

(56) References Cited

U.S. PATENT DOCUMENTS

| | | | | |
|---|---|---|---|---|
| 4,502,278 A | * | 3/1985 | Stark | 55/DIG. 10 |
| 4,549,398 A | * | 10/1985 | Oishi et al. | 55/DIG. 10 |
| 4,665,690 A | * | 5/1987 | Nomoto et al. | 55/DIG. 10 |
| 4,881,959 A | * | 11/1989 | Kono et al. | 55/282.3 |
| 4,887,426 A | * | 12/1989 | Goerlich | 60/274 |
| 5,489,319 A | * | 2/1996 | Tokuda et al. | 55/282.3 |
| 5,972,075 A | * | 10/1999 | Fukuda et al. | 55/282.3 |
| 6,802,180 B2 | * | 10/2004 | Gabe et al. | 60/311 |
| 2004/0103654 A1 | * | 6/2004 | Ohtake et al. | 60/311 |

FOREIGN PATENT DOCUMENTS

| | | | | |
|---|---|---|---|---|
| EP | 1 291 514 A2 | * | 3/2003 | F01N 3/023 |
| JP | 2003-201829 | * | 7/2003 | B01D 46/42 |

* cited by examiner

Primary Examiner—Duane Smith
Assistant Examiner—Jason M. Greene
(74) Attorney, Agent, or Firm—Nixon & Vanderhye P.C.

(57) ABSTRACT

A flow rate of gas supplied to a diesel particulate filter is increased when it is determined that rapid combustion of collected particulates, which are collected by the particulate filter, is likely to occur based on an operating state of an internal combustion engine. Alternatively, the flow rate of gas supplied to the filter is increased when it is determined that rapid combustion of the collected particulates is initiated based on a state of the particulate filter.

35 Claims, 23 Drawing Sheets

EXHAUST GAS FILTERING SYSTEM HAVING PARTICULATE FILTER FOR INTERNAL COMBUSTION ENGINE

CROSS REFERENCE TO RELATED APPLICATION

This application is based on and incorporates herein by reference Japanese Patent Application No. 2002-173095 filed on Jun. 13, 2002 and Japanese Patent Application No. 2002-323591 filed on Nov. 7, 2002.

BACKGROUND OF THE INVENTION

1. Field of the Invention

The present invention relates to an exhaust gas filtering system having a particulate filter, which captures particulates contained in exhaust gas of an internal combustion engine.

2. Description of Related Art

Because of environmental concerns, it has been demanded to reduce the amount of particulates, which includes soot particulates and non-combusted particulates, discharged from a diesel engine. To meet this demand, an exhaust gas filtering system having a diesel particulate filter (DPF), which collects the particulates, is inserted in an exhaust pipe of the engine. In general, the DPF is made of a porous ceramic body, which defines a plurality of exhaust gas passages therein. When exhaust gas passes through porous walls of the DPF, which define the exhaust gas passages, the particulates are adsorbed and collected by the porous walls of the DPF.

When the collected particulates are accumulated in the DPF, pressure loss is increased, and the engine performance is deteriorated. Thus, the collected particulates need to be combusted and removed from the DPF to regenerate the DPF at appropriate timing. The regeneration of the DPF is performed by increasing the temperature of the DPF through a heating means, such as a burner or a heater or through supply of hot exhaust gas to the DPF in post fuel injection.

When the amount of the collected particulates of the DPF becomes equal to or greater than a predetermined amount, the collected particulates could be spontaneously combusted due to the increase in the DPF temperature. At this time, depending on the operating state of the engine, the collected particulates can be rapidly combusted to rapidly generate heat. In such a case, the temperature of the DPF is excessively increased to damage the DPF. In a case where a catalyst is supported by the DPF, some problems, such as degradation of the catalyst, could occur. This poses a significant problem on the system, which uses the DPF. The rapid heat generation tends to occur when the engine is in a decelerating operating mode under the high temperature condition of the DPF. When the engine is in the decelerating operating mode, an oxygen concentration of the exhaust gas becomes relatively high, and a degree of opening of an intake throttle valve is reduced to maintain the temperature of the catalyst. Thus, the flow rate of exhaust gas supplied to the DPF becomes relatively low, and thus the temperature of the DPF is increased.

SUMMARY OF THE INVENTION

The present invention addresses the above disadvantages. Thus, it is an objective of the present invention to provide an exhaust gas filtering system, which has an DPF and is capable of effectively restraining occurrence of rapid combustion of collected particulates in the DPF.

To achieve the objective of the present invention, there is provided an exhaust gas filtering system for an internal combustion engine. The exhaust gas filtering system includes a particulate filter, a regenerating means and a control means. The particulate filter is inserted in an exhaust pipe of the internal combustion engine and collects particulates contained in exhaust gas supplied from the internal combustion engine through the exhaust pipe. The regenerating means is for regenerating the particulate filter. The control means is for performing flow rate increasing control operation to increase a flow rate of gas supplied to the particulate filter when one of the following two conditions is satisfied:

it is determined by the control means that rapid combustion of the collected particulates, which are collected by the particulate filter, is likely to occur based on an operating state of the internal combustion engine; and it is determined by the control means that rapid combustion of the collected particulates is initiated based on a state of the particulate filter.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

(First Embodiment)

Figure 1:
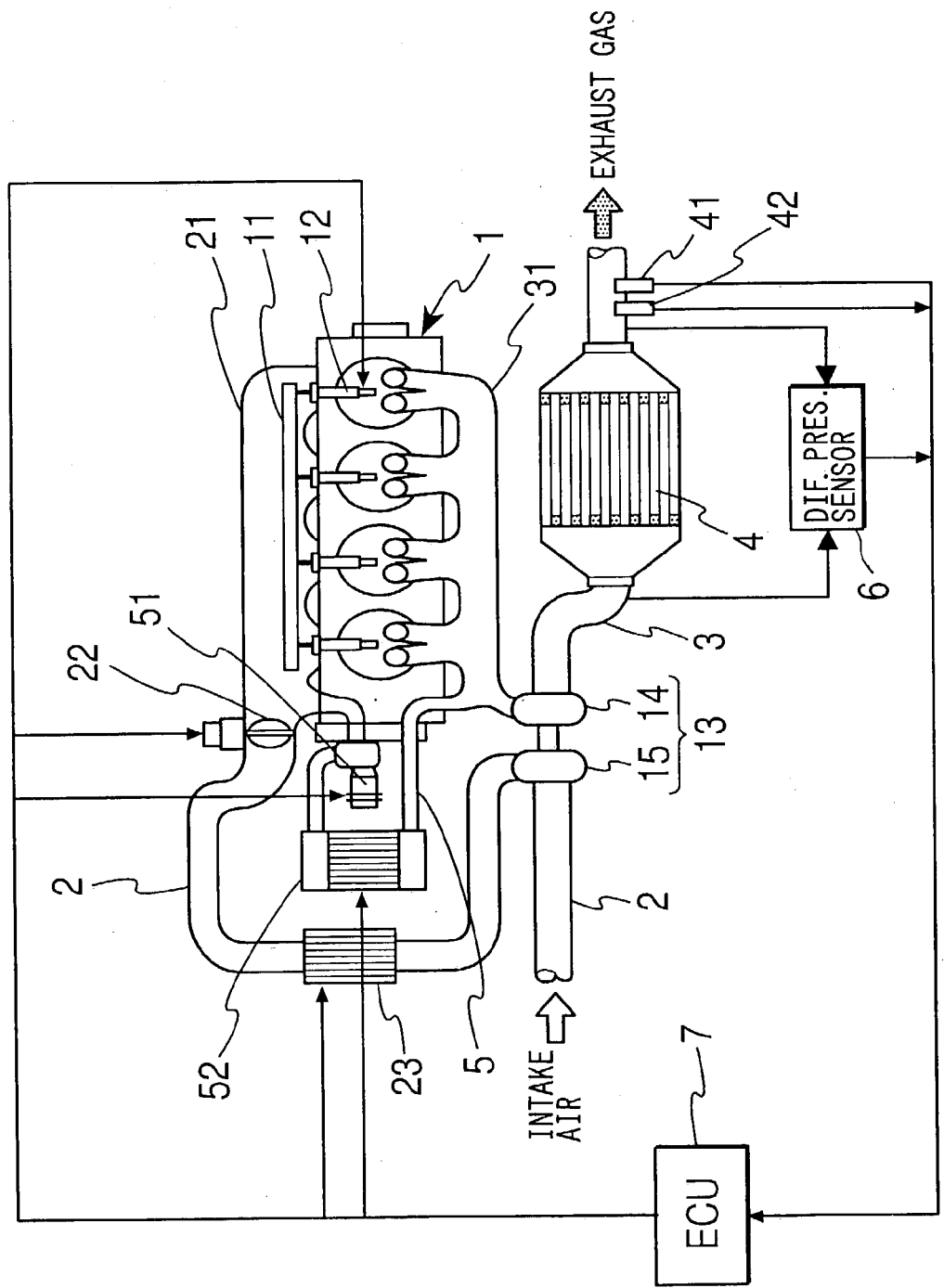
FIG. 1 is a schematic view of an exhaust gas filtering system for an internal combustion engine according to a first embodiment of the present invention.

A first embodiment of the present invention will be described with reference to FIG. 1. FIG. 1 schematically shows an entire structure of a diesel engine (internal combustion engine) 1, in which an exhaust gas filtering system of the present embodiment is provided. The engine 1 includes a common rail 11 and a plurality of fuel injection valves 12. The common rail 11 is common to all of cylinders of the engine 1. Each fuel injection valve 12 is connected to the common rail 11 and injects fuel into a combustion chamber of a corresponding one of the cylinders. An intake manifold 21 of the engine 1 is connected to an intake pipe 2. The flow rate of intake air in the intake manifold 21 is adjusted by an intake throttle valve 22 arranged in a connection between the intake pipe 2 and the intake manifold 21.

An exhaust manifold 31 of the engine 1 is connected to an exhaust pipe 3. A diesel particulate filter 4 (DPF) is inserted in the exhaust pipe 3. The DPF 4 has a known structure. In the manufacturing of the DPF 4, for example, refractory ceramics, such as cordierite, is molded into a honeycomb structure that has a plurality of cells, each of which is defined by corresponding porous walls. Ends of the cells are alternately closed such that each cell only has one of an inlet opening and an outlet opening at its open end. Thus, the exhaust gas of the engine 1 is introduced into the DPF 4 such that the exhaust gas enters the inlet opening of one cell and is supplied to the next cell through the corresponding porous wall and is discharged through the outlet opening of the next cell. Particulates contained in the exhaust gas are filtered and collected by the DPF 4 when the exhaust gas passes through the porous wall of each corresponding cell. Catalyst coating, which promotes oxidation of the particulates, can be optionally applied to the inner surfaces of the DPF 4, which contact with the exhaust gas, as is desired.

A turbine 14 of a centrifugal supercharger 13 is arranged upstream of the DPF 4 in the exhaust pipe 3. The turbine 14 is mechanically connected to a compressor 15 arranged in the intake pipe 2 through a turbine shaft. With this arrangement, the turbine 14 is driven by heat energy of the exhaust gas, and the compressor 15 is rotated by the turbine 14 through the turbine shaft to compress the intake air supplied to the intake pipe 2. A cooler 23 is arranged upstream of the throttle valve 22 in the intake pipe 2 to cool the compressed hot intake air, which has been compressed by the compressor 15.

The exhaust manifold 31 is connected to the intake manifold 21 through an EGR passage 5, so that a portion of the exhaust gas is recirculated into the intake manifold 21 through the. EGR passage 5. An EGR valve 51 is arranged in an outlet of the EGR passage 5, which is connected to the intake manifold 21. By adjusting a degree of opening of the EGR valve 51, the amount of exhaust gas recirculated into the intake manifold 21 is adjusted. An EGR cooler 52 for cooling the recirculated EGR gas is inserted in the EGR passage 5.

In order to determine the amount of collected particulates in the DPF 4 (hereinafter, referred to as "collected particulate amount"), a differential pressure sensor 6 is connected to the exhaust pipe 3. The differential pressure sensor 6 measures a pressure difference between an upstream side of the DPF 4 and a downstream side of the DPF 4. The differential pressure sensor 6 is connected to a portion of the exhaust pipe 3 located upstream of the DPF 4 through a pressure conducting pipe and is also connected to another portion of the exhaust pipe 3 located downstream of the DPF 4 through another pressure conducting pipe. The differential pressure sensor 6 outputs a signal that corresponds to the measured pressure difference between the upstream side of the DPF 4 and the downstream side of the DPF 4. An exhaust gas temperature sensor 41 and an air/fuel ratio sensor (A/F sensor) 42 are arranged at the outlet of the DPF 4. The exhaust gas temperature sensor 41 serves as a DPF temperature sensing means (or alternatively referred to as a filter temperature sensing means) of the present invention. The A/F sensor 42 serves as an oxygen concentration sensing means of the present invention for sensing the oxygen concentration at the downstream side of the DPF 4. Sensor outputs of the above-described sensors 6, 41, 42 are supplied to an ECU 7, which serves as a control means.

The ECU 7 also receives outputs of various other sensors, which respectively measures, for example, a degree of opening of the throttle valve 22, a degree of opening of the EGR valve 51, an engine rotational speed, a vehicle speed, an accelerator pedal position, a coolant temperature, a crank position and a fuel pressure. The ECU 7 determines the operating state of the engine 1 based on these sensor outputs. The ECU 7 computes the suitable fuel injection amount (i.e., the suitable amount of fuel injected in the engine 1) and the suitable EGR amount (i.e., the suitable flow rate of EGR gas), which are suitable for the current operating state of the engine 1, and performs feedback control of, for example, the throttle valve 22, the fuel injection valves 12 and the EGR valve 51. The ECU 7 also computes the collected particulate amount (i.e., estimated particulate amount) of the DPF 4 based on the flow rate (volume flow rate) of exhaust gas and the pressure difference between the upstream side of the DPF 4 and the downstream side of the DPF 4. Here, the ECU 7 serves as a particulate amount computing means of the present invention for computing the collected particulate amount of the DPF 4 (also alternatively referred to as a particulate amount sensing means for sensing the collected particulate amount of the DPF 4). Furthermore, the flow rate of exhaust gas is computed based on the measured value of the intake air flow sensor (not shown), which measures the flow rate of intake air supplied to the intake pipe 2, and the measured value of the exhaust gas temperature sensor 41. Then, the ECU 7 controls regeneration of the DPF 4. In general, in a case where the flow rate of exhaust gas is fixed at a predetermined level, when the collected particle amount of the DPF 4 increases, the pressure difference between the upstream side of the DPF 4 and the downstream side of the DPF 4 increases. The collected particulate amount of the DPF 4 can be computed based on this relationship. When the collected particulate amount of the DPF 4 computed in this manner exceeds a predetermined amount, the regeneration process of the DPF 4 is initiated. In the regeneration process of the DPF 4, the DPF 4 is heated to combust and to remove the collected particulates.

In the present embodiment, a regenerating means for regenerating the DPF 4 is implemented in the following manner. That is, at the time of injecting fuel into the corresponding combustion chamber from the fuel injection valve 12, post fuel injection or retardation of fuel injection timing is performed, or alternatively the degree of opening of the throttle valve 22 is reduced in comparison to the normal degree of opening of the throttle valve 22 that is set for a normal operating period of the exhaust gas filtering system, i.e., for a non-regenerating period of the DPF 4. In this way, the temperature of exhaust gas is increased. For example, when the post fuel injection or the retardation of fuel injection timing is performed, a portion of the combustion energy is converted into heat energy instead of being converted into rotational drive force due to, for example, the delay of the ignition timing. Thus, exhaust gas of increased temperature (300 to 700 degrees Celsius), which is higher than the normal exhaust gas temperature (150 to 400 degrees Celsius), is introduced into the DPF 4. Similarly, when the degree of opening of the throttle valve 22 is reduced in comparison to the normal degree of opening of the throttle valve 22 that is set for the normal operating period, the flow rate of intake air is reduced, and the thermal capacity of the gas supplied into the corresponding combustion chamber of the engine 1 is reduced. Thus, the exhaust gas temperature is increased. The collected particulates collected by the DPF 4 are combusted by the exhaust gas of the increased temperature, so that the particulate collecting performance of the DPF 4 is recovered. Here, it should be noted that a plurality of regenerating means can be provided, and an appropriate one of the regenerating means can be used based on the operating state of the engine 1. Also, in place of the above described regenerating means, a burner or heater can be used as the regenerating means.

Under a certain operating state of the engine 1, when the amount of particulates deposited in the DPF 4 is relatively large, and the temperature (DPF temperature) of the DPF 4 is relatively high, the particulates can be rapidly combusted, resulting in a rapid increase in the temperature of the DPF 4. In the present embodiment, this rapid increase in the temperature is alleviated in the following manner. That is, when it is determined that such rapid combustion of the collected particulates is likely to occur (i.e., when it is determined that the possibility of such rapid combustion of the collected particulates is relatively high) based on the operating state of the engine 1 detected by the ECU 7, the flow rate of gas supplied to the DPF 4 is increased through flow rate increasing control operation, which is different from the above-described regeneration control operation of the DPF 4, so that the temperature of the DPF 4 is reduced. Here, when the engine 1 is in a decelerating operating mode that involves fuel cutoff, and the temperature of the DPF 4 is equal to or greater than a corresponding combustible state threshold value T1, it is determined that the rapid combustion of particulates is likely to occur.

Figure 2:
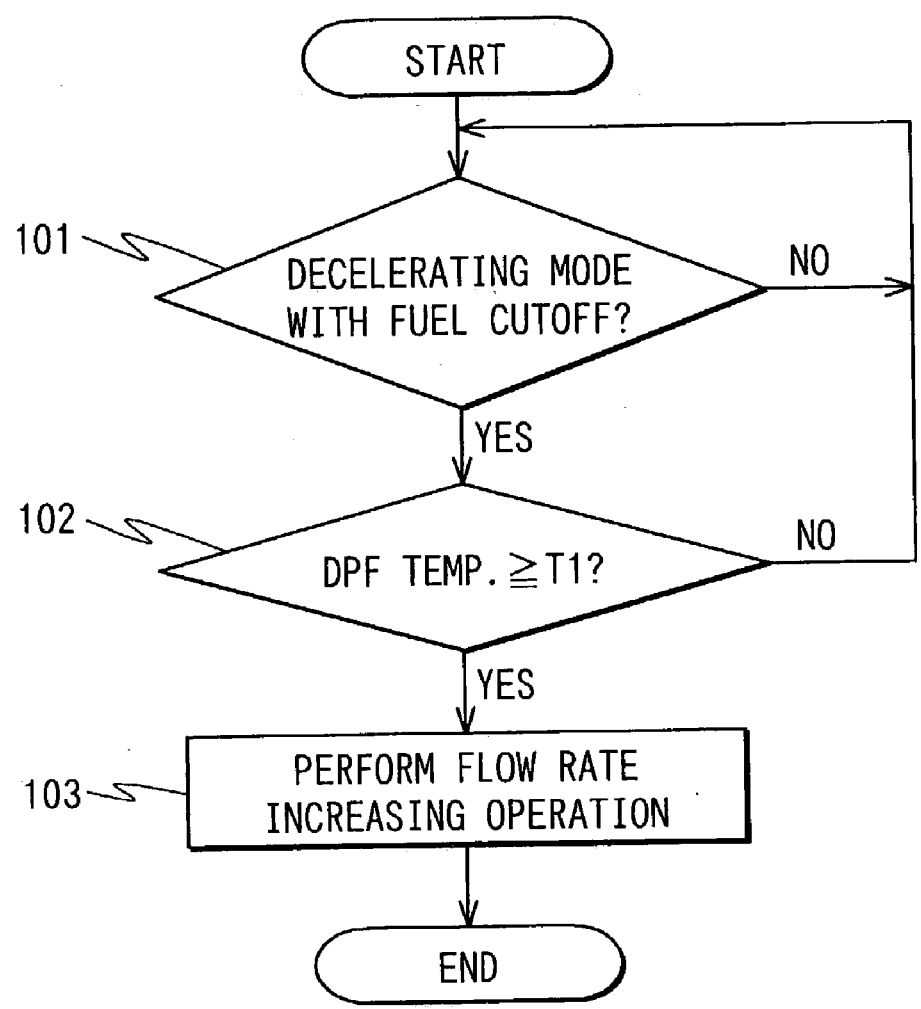
FIG. 2 is a flow chart showing control operation of an ECU of the exhaust gas filtering system.
Figure 3:
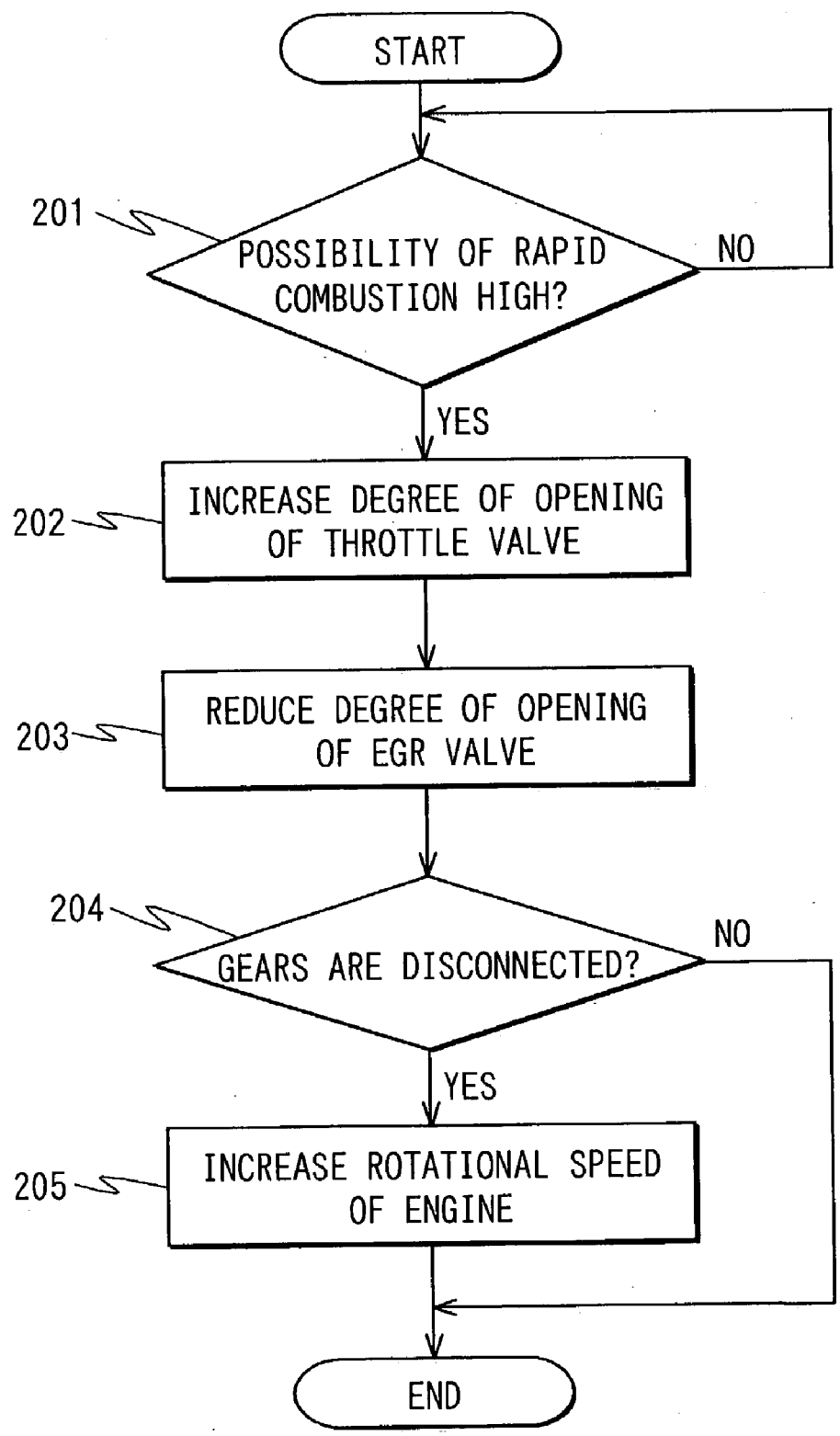
FIG. 3 is a flow chart showing control operation of the ECU of the exhaust gas filtering system according to a second embodiment of the present invention.

FIG. 2 shows a flow chart showing the above-described operation of the ECU 7. In FIG. 2, at step 101, based on the outputs of the above-described sensors, it is determined whether the engine 1 is in the decelerating operating mode that involves fuel cutoff. When it is determined that the engine 1 is in the decelerating operating mode that involves the fuel cutoff at step 101, control proceeds to step 102. At step 102, it is determined whether the temperature of the DPF 4 measured with the exhaust gas temperature sensor 41 is equal to or greater than the predetermined temperature (the combustible state threshold value T1), at which the rapid combustion of the particulates is likely to occur. When it is determined that the temperature of the DPF 4 is equal to or greater than the threshold value T1 at step 102, control proceeds to step 103. When "NO" is returned at any of steps 101, 102, control returns to "START" in FIG. 2.

At step 103, the flow rate increasing control operation for increasing the flow rate of gas supplied to the DPF 4 is performed. Specifically, the degree of opening of the throttle valve 22 is increased in comparison to the normal degree of opening of the throttle valve 22 that is set for the normal operating period, i.e., for the non-regenerating period of the DPF 4 to increase the flow rate of intake air supplied to the engine 1, or alternatively, the degree of opening of the EGR valve 51 is reduced in comparison to the normal degree of opening of the EGR valve 51 that is set for the normal operating period to reduce the flow rate of EGR gas recirculated into the EGR passage 5. In this way, the flow rate of exhaust gas (or gas) supplied to the DPF 4 is increased. Preferably, both of the above operations are simultaneously performed to increase the degree of opening of the throttle valve 22 and to decrease the degree of opening of the EGR valve 51.

When the engine 1 is operated in the decelerating operating mode that involves the fuel cutoff, the oxygen concentration in the exhaust gas becomes relatively high, and the flow rate of gas becomes relatively low. Thus, the temperature of the DPF 4 is likely to increase. However, through the flow rate increasing control operation, the flow rate of gas is increased, so that the temperature of the DPF 4 is reduced. At this time, the degree of opening of the throttle valve 22 and/or the degree of opening of the EGR valve 51 are set to provide the required flow rate of gas and are maintained for a predetermined time period, so that the temperature of the DPF 4 is sufficiently reduced. Thus, the rapid combustion of the collected particulates and rapid increase of the heat are less likely to occur. Furthermore, the DPF 4 is reliably and safely regenerated through the above-described normal regeneration control operation, resulting in improvement of safety and durability of the DPF 4.

(Second Embodiment)

A second embodiment of the present invention will be described with reference to FIGS. 3 to 6. The flow rate increasing control operation (step 103) for increasing the flow rate of gas supplied to the DPF 4 is not limited to the above described one, in which the degree of opening of the throttle valve 22 and/or the degree of opening of the EGR valve 51 are adjusted. This will be described with reference to FIG. 3. At step 201, it is determined by the ECU 7 whether the possibility of rapid combustion of the collected particulates is relatively high. When it is determined that the possibility of rapid combustion of the collected particulates is relatively high at step 201, control proceeds to step 202. At step 201, whether the possibility of rapid combustion of the collected particulates is relatively high is determined by the method described with reference to FIG. 2 or a method described in one of the following embodiments. When "NO" is returned at step 201, control repeats step 201.

At step 202, the degree of opening of the throttle valve 22 is increased in comparison to the normal degree of opening of the throttle valve 22 that is set for the normal operating period, i.e., for the non-regenerating period of the DPF 4, so that the flow rate of intake air supplied to the engine 1 is increased Next, control proceeds to step 203 where the degree of opening of the EGR valve 51 is reduced in comparison to the normal degree of opening of the EGR valve 51 that is set for the normal operating period to reduce the flow rate of EGR gas recirculated to the EGR passage 5, so that the flow rate of gas supplied to the DPF 4 is increased.

Then, control proceeds to step 204 where it is determined whether the clutch is disengaged, i.e., whether transmission gears of a transmission are disconnected from a drive shaft, which serves as a load of the engine 1. When it is determined that the clutch is disengaged at step 204, control proceeds to step 205. This can be determined by, for example, determining the current shift position of the transmission. Here, in general, "YES" is returned when the engine 1 is shifted to the idling mode. At step 205, the fuel injection amount is increased in comparison to the normal fuel injection amount that is set for the normal operating period to increase the rotational speed of the engine 1 in comparison to the normal rotational speed of the engine 1 that is set for the normal operating period. In this way, the number of intake strokes per unit time and the number of exhaust strokes per unit time are increased, so that the flow rate of gas supplied to the DPF 4 is accordingly increased. When "NO" is returned at step 204, control skips step 205, and the current flow ends.

Figure 4:
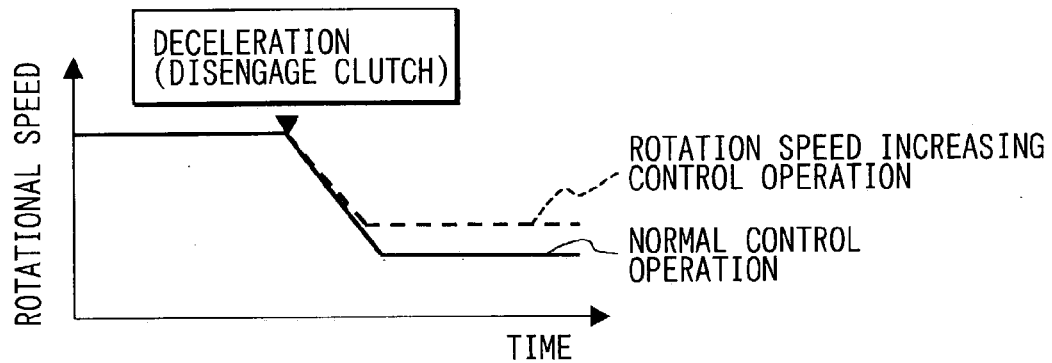
FIG. 4 is a graph showing operating states of the engine according to the second embodiment.
Figure 5:
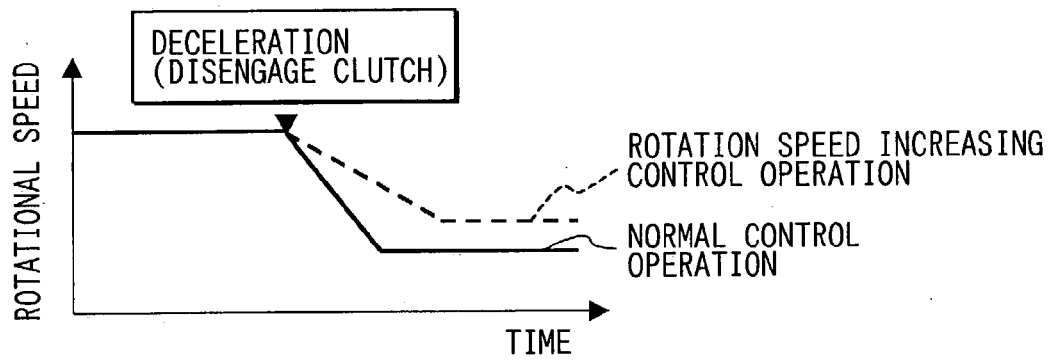
FIG. 5 is a graph showing operating states of the engine according to a modification of the second embodiment.
Figure 6:
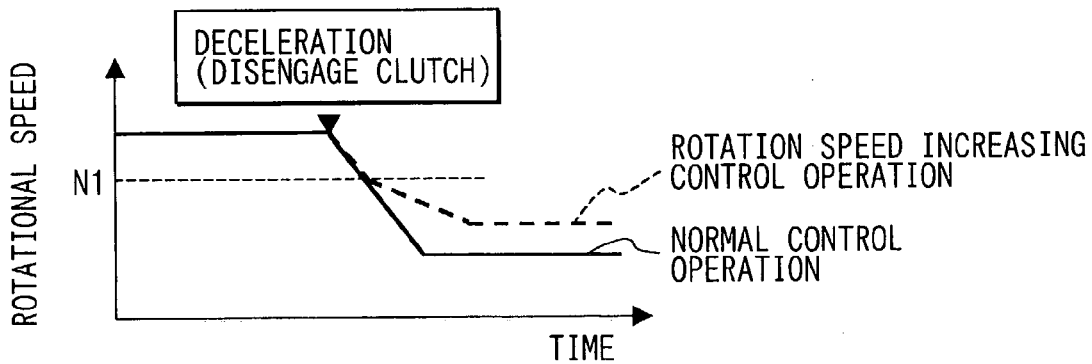
FIG. 6 is a graph showing operating states of the engine according to another modification of the second embodiment.

The rotational speed increasing control operation (step 205) can be performed such that the rotational speed of the engine 1 is adjusted to a corresponding disengaged state offset rotational speed (indicated by a dotted line in FIG. 4), which is increasingly offset by a predetermined amount from the preset disengaged state normal rotational speed (indicated by a solid line in FIG. 4) of the engine 1 that is preset for a completely disengaged normal state of the clutch in the normal control operation, as shown in FIG. 4. Alternatively, the rotational speed increasing control operation (step 205) can be performed such that the rotational speed of the engine 1 is gradually reduced toward the above-described offset rotational speed at a rate slower than that of the normal operation period after the disengagement of the clutch, as shown in FIG. 5. In the latter case, the time period for driving the engine 1 at the higher rotational speed, which is higher than the preset rotational speed after the disengagement of the clutch, is lengthened in comparison to the former case. Thus, the further sufficient flow rate of gas supplied to the DPF 4 can be achieved. Alternatively, the above-described gradual reduction of the rotational speed of the engine 1 can be initiated when the engine speed is reduced to a predetermined rotational speed N1 after the disengagement of the clutch, as shown in FIG. 6. In this way, the rotational speed of the engine 1 is reduced rapidly until the rotational speed reaches the predetermined rotational speed N1. In this case, the time period for driving the engine 1 at the high rotational speed is shortened, so that noises generated due to the high rotational speed can be advantageously reduced.

(Third Embodiment)

Figure 7:
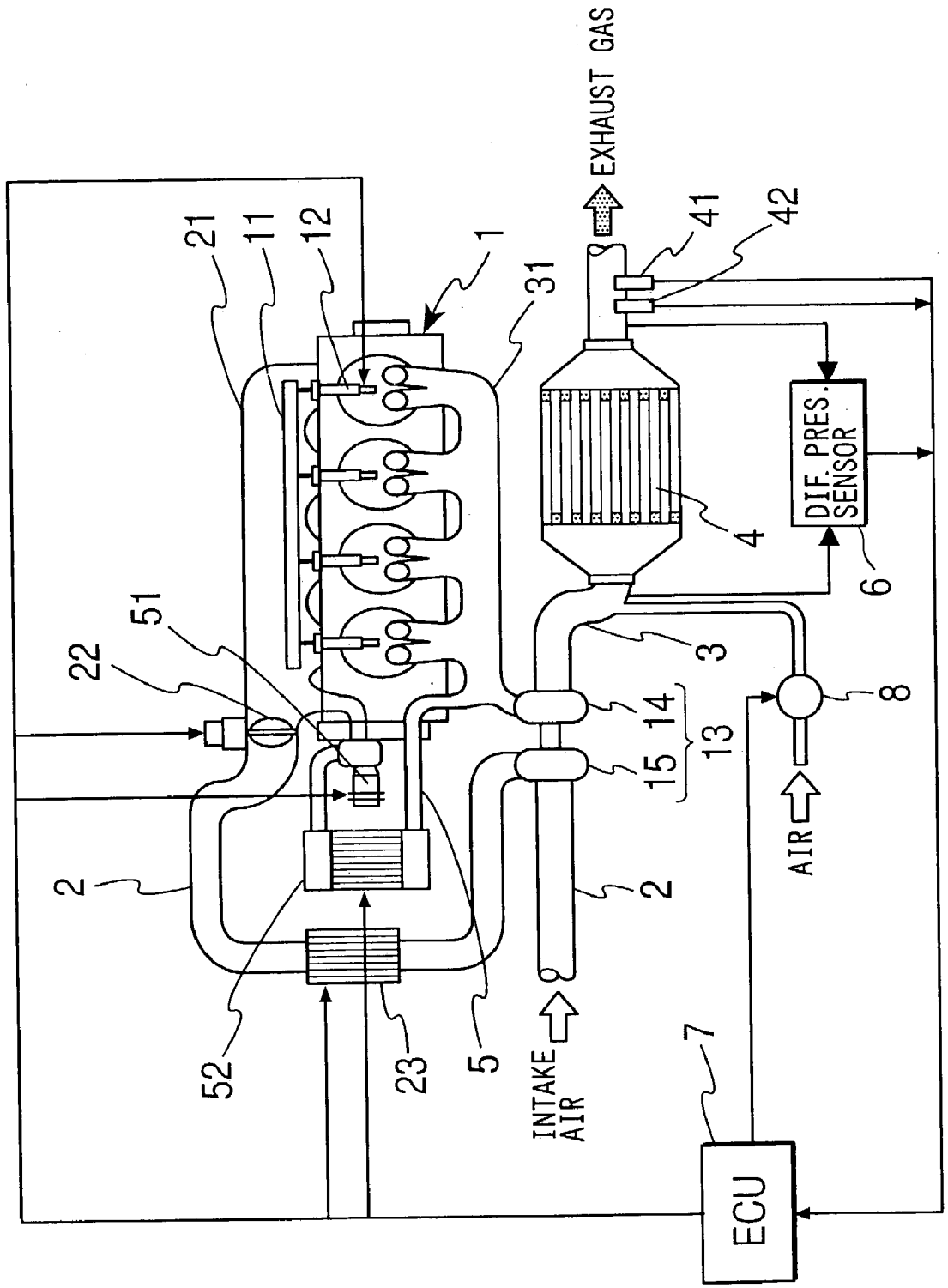
FIG. 7 is a schematic view of an exhaust gas filtering system for an internal combustion engine according to a third embodiment of the present invention.

A third embodiment of the present invention will be described with reference to FIG. 7. FIG. 7 shows another type of control operation (step 103) for increasing the flow rate of gas supplied to the DPF 4 according to the third embodiment. A structure of an exhaust gas filtering system according to the third embodiment is substantially the same as that of FIG. 1 except a compressor (air supplying means) 8, which is connected to the exhaust pipe 3 at the position upstream of the DPF 4 to provide compressed air to the DPF 4 from the upstream side of the DPF 4. The compressor 8 is controlled by the ECU 7 to supply compressed air to the DPF 4 at predetermined timing. The flow rate of gas supplied to the DPF 4 is increased by the amount that corresponds to the amount of compressed air supplied to the DPF 4 from the compressor 8, so that the temperature of the DPF 4 can be advantageously reduced.

Although the gas flow rate increasing means for increasing the flow rate of the gas supplied to the DPF 4 is implemented through the incremental adjustment of the degree of opening of the throttle valve, the decremental adjustment of the degree of opening of the EGR valve and/or the incremental adjustment of the rotational speed of the engine, any one of these adjustments can be performed alone, or these adjustments can be performed in any combination.

(Fourth Embodiment)

Figure 8:
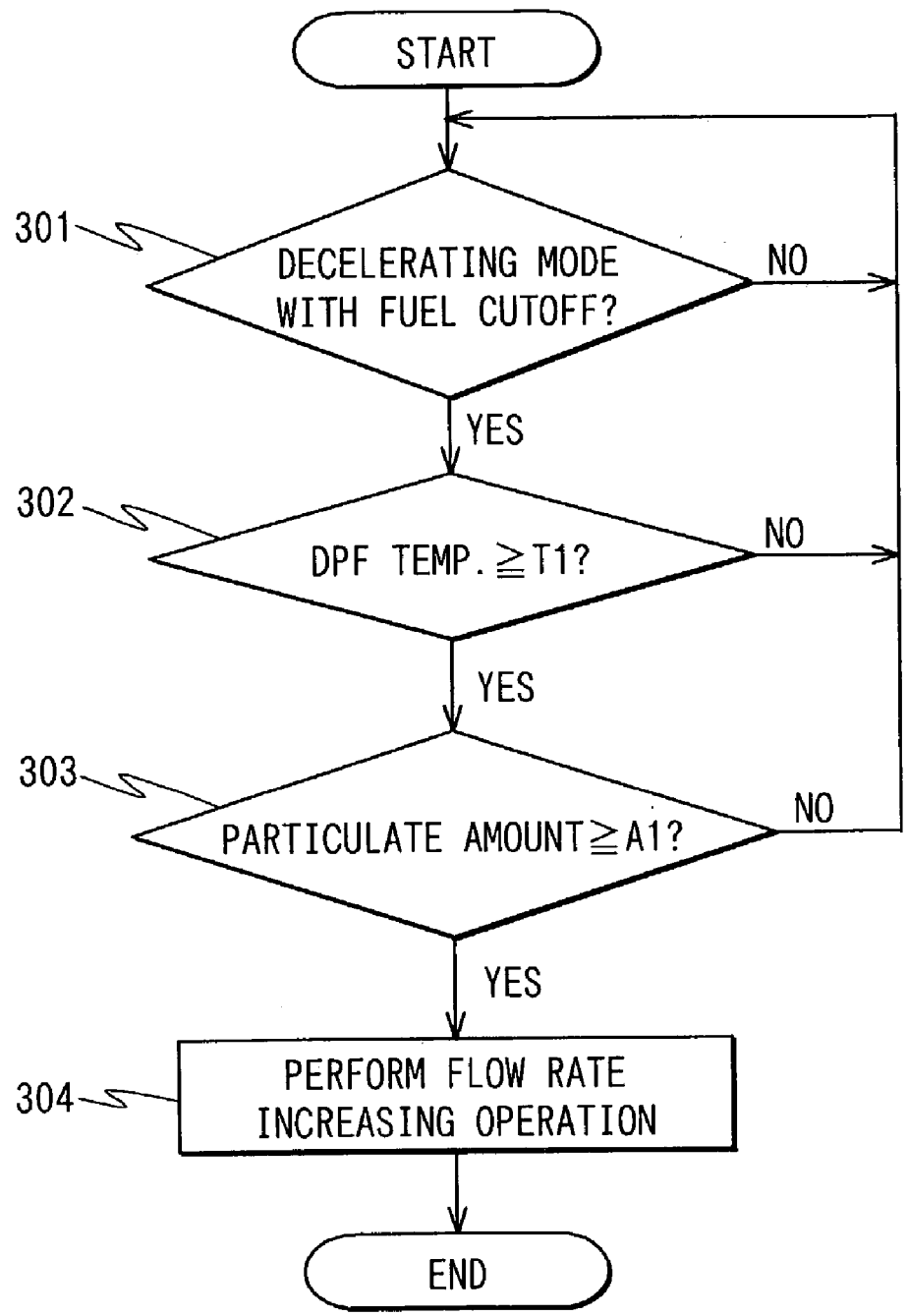
FIG. 8 is a flow chart showing control operation of the ECU of the exhaust gas filtering system according to a fourth embodiment of the present invention.

A fourth embodiment of the present invention will be described with reference to FIG. 8. A structure of an exhaust gas filtering system according to the fourth embodiment is substantially the same as that of the first embodiment and thus will not be depicted. In the present embodiment, the flow rate increasing control operation for increasing the flow rate of gas supplied to the DPF 4 is performed when the following conditions are all satisfied:

based on the operating state of the engine 1 detected by the ECU 7, it is determined that rapid combustion of the collected particulates, which are collected by the DPF 4, is likely to occur;

the temperature of the DPF 4 is equal to or greater than the threshold value T1; and the collected particulate amount is equal to or greater than a corresponding combustible state threshold value A1.

A flow chart of the above operation performed by the ECU 7 will be described with reference to FIG. 8. First, at step 301, it is determined by the ECU 7 whether the engine 1 is in the decelerating operating mode that involves fuel cutoff. When it is determined that the engine 1 is in the decelerating operating mode that involves fuel cutoff at step 301, control proceeds to step 302. At step 302, it is determined whether the temperature of the DPF 4 is equal to or greater than the threshold value T1. When it is determined that the temperature of the DPF 4 is equal to or greater than the threshold value T1 at step 302, control proceeds to step 303. At step 303, it is determined whether the collected particulate amount, which is computed by the particulate amount computing means, is equal to or greater than a predetermined amount (i.e., the threshold value A1), which likely causes the rapid combustion of the collected particulates. When it is determined that the collected particulate amount is equal to or greater than the threshold value A1 at step 303, control proceeds to step 304. When "NO" is returned at any of steps 301, 302, 303, control returns to "START" in FIG. 8.

At step 304, the flow rate increasing control operation for increasing the flow rate of gas supplied to the DPF 4 is performed in the manner similar to that of the first embodiment to reduce the temperature of the DPF 4. In the present embodiment, however, the flow rate increasing control operation is performed only when the collected particulate amount reaches the predetermined amount (i.e., the threshold value A1), which likely causes the rapid combustion of the collected particulates. Thus, the above-described advantages are more efficiently achieved.

(Fifth Embodiment)

Figure 9:
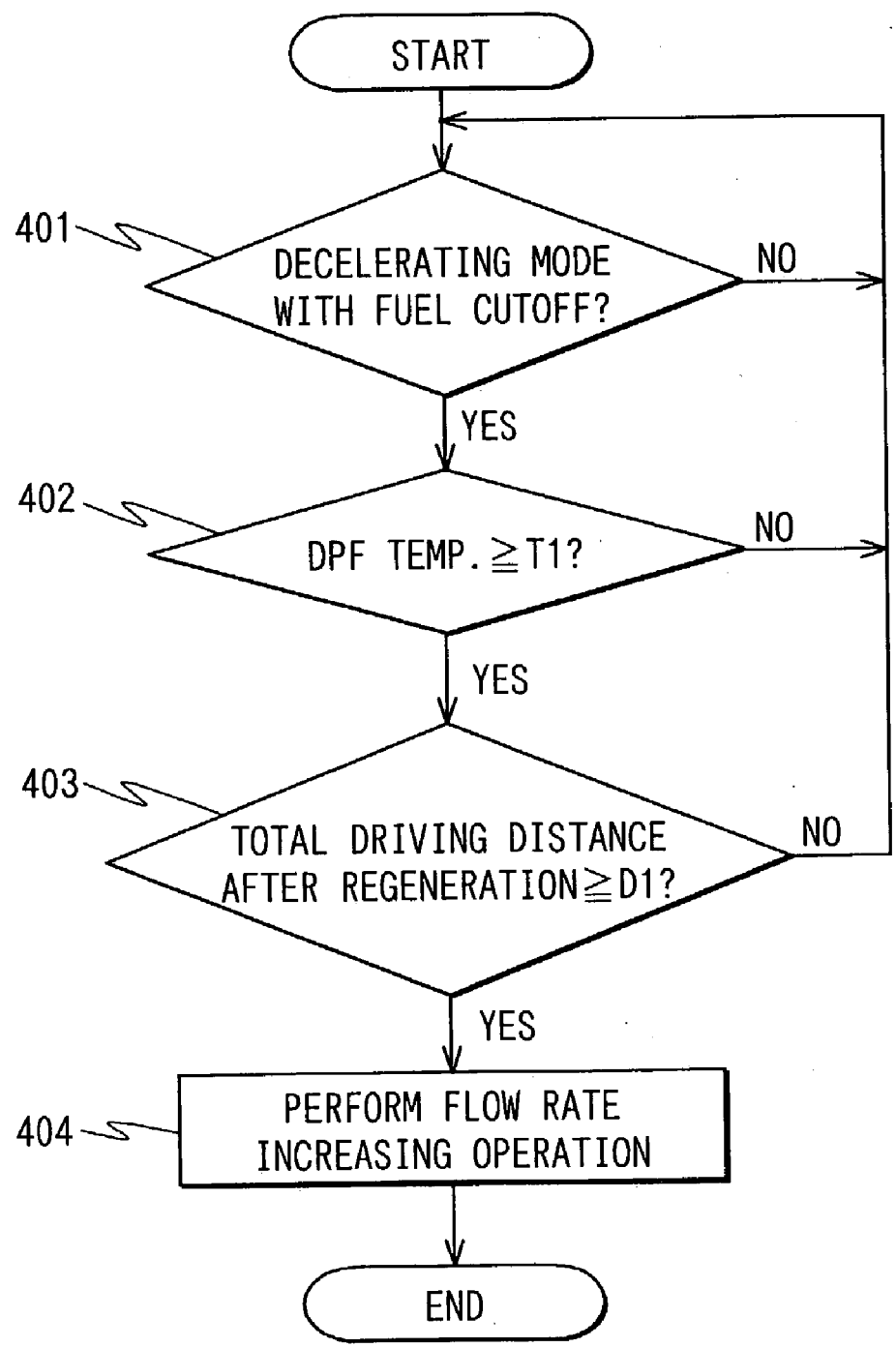
FIG. 9 is a flow chart showing control operation of the ECU of the exhaust gas filtering system according to a fifth embodiment of the present invention.

A fifth embodiment of the present invention will be described with reference to FIG. 9. A structure of an exhaust gas filtering system according to the fifth embodiment is substantially the same as that of the first embodiment and thus will not be depicted. In the present embodiment, the flow rate increasing control operation for increasing the flow rate of gas supplied to the DPF 4 is performed when the following conditions are all satisfied:

based on the operating state of the engine 1 detected by the ECU 7, it is determined that rapid combustion of the collected particulates, which are collected by the DPF 4, is likely to occur;

the temperature of the DPF 4 is equal to or greater than the threshold value T1; and a total driving distance of the vehicle since the end of the last regeneration of the DPF 4 by the regenerating means is equal to or greater than a corresponding combustible state threshold value D1.

A flow chart of the above operation performed by the ECU 7 will be described with reference to FIG. 9. First, at step 401, it is determined by the ECU 7 whether the engine 1 is in the decelerating operating mode that involves fuel cutoff. When it is determined that the engine 1 is in the decelerating operating mode that involves fuel cutoff at step 401, control proceeds to step 402. At step 402, it is determined whether the temperature of the DPF 4 is equal to or greater than the threshold value T1. When it is determined that the temperature of the DPF 4 is equal to or greater than the threshold value T1 at step 402, control proceeds to step 403. At step 403, it is determined whether the total driving distance of the vehicle since the end of the last regeneration of the DPF 4 is equal to or greater than the threshold value D1, which likely causes the rapid combustion of the collected particulates. When it is determined that the total driving distance of the vehicle is equal to or greater than the threshold value D1 at step 403, control proceeds to step 404. When "NO" is returned at any of steps 401, 402, 403, control returns to "START" in FIG. 9.

At step 404, the flow rate increasing control operation for increasing the flow rate of gas supplied to the DPF 4 is performed in the manner similar to that of the first embodiment to reduce the temperature of the DPF 4. When the temperature increasing control operation for increasing the temperature of the DPF 4 has not been performed for a relatively long period of time since the end of the last regeneration of the DPF 4, it is assumed that a relatively large amount of the particulates, which is greater than a predetermined amount, is deposited in the DPF 4. In such a case, the rapid temperature increase of the DPF 4 is likely to occur. Therefore, the collected particulate amount can be estimated based on the total driving distance of the vehicle like in the present embodiment. Even in this way, advantages similar to those discussed in the above embodiments can be achieved. In place of the total driving distance of the vehicle, a total amount of fuel injected in the engine 1 since the end of the last regeneration of the DPF 4 by the regenerating means can be used. In such a case, the total amount of fuel injected in the engine 1 is compared with a corresponding combustible state threshold value Q1. Even in this way, advantages similar to those discussed in the above embodiments can be achieved.

(Sixth Embodiment)

Figure 10:
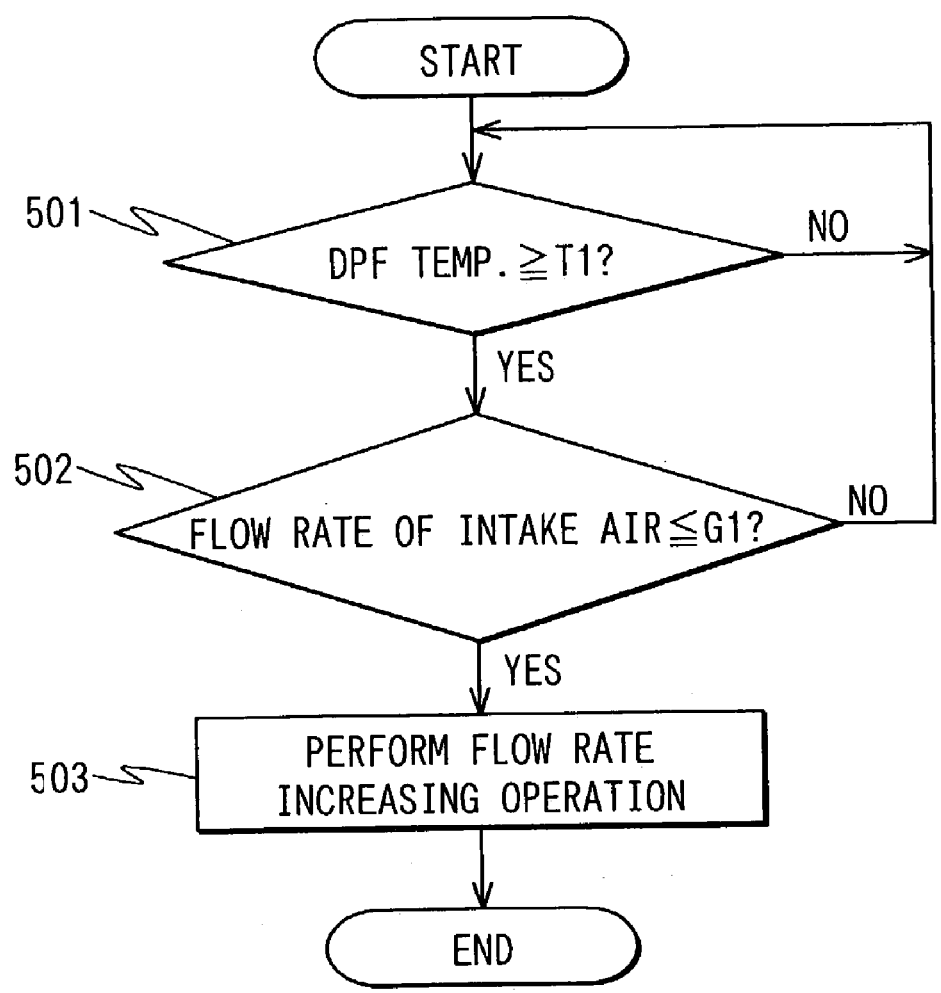
FIG. 10 is a flow chart showing control operation of the ECU of the exhaust gas filtering system according to a sixth embodiment of the present invention.

A sixth embodiment of the present invention will be described with reference to FIG. 10. A structure of an exhaust gas filtering system according to the sixth embodiment is substantially the same as that of the first embodiment and thus will not be depicted. In the present embodiment, the flow rate increasing control operation for increasing the flow rate of gas supplied to the DPF 4 is performed when the following conditions are all satisfied:

based on the operating state of the engine 1 detected by the ECU 7, it is determined that rapid combustion of the collected particulates, which are collected by the DPF 4, is likely to occur;

the temperature of the DPF 4 is equal to or greater than the threshold value T1; and the flow rate of intake air of the engine 1 is equal to or less than a corresponding combustible state threshold value G1. The flow rate of intake air of the engine 1 can be determined based on a measured value of, for example, a mass air flow meter or can be alternatively determined from a map based on an operating state parameter, such as an intake air pressure.

A flow chart of the above operation performed by the ECU 7 will be described with reference to FIG. 10. First, at step 501, it is determined whether the temperature of the DPF 4 is equal to or greater than the threshold value T1. When it is determined that the temperature of the DPF 4 is equal to or greater than the threshold value T1 at step 501, control proceeds to step 502. At step 502, it is determined whether the flow rate of intake air of the engine 1 is equal to or less than the threshold value G1. When it is determined that the flow rate of intake air of the engine 1 is equal to or less than the threshold value G1 at step 502, control proceeds to step 503. When "NO" is returned at any of steps 501, 502, control returns to "START" in FIG. 10.

At step 503, the flow rate increasing control operation for increasing the flow rate of gas supplied to the DPF 4 is performed in the manner similar to that of the first embodiment to reduce the temperature of the DPF 4.

When the flow rate of intake air is relatively small, the flow rate of gas supplied to the DPF 4 becomes relatively small to cause an increase in the temperature of the DPF 4. When the flow rate of gas supplied to the DPF 4 is increased through the above-described control operation, the temperature of the DPF 4 can be reduced. At this time, the degree of opening of the throttle valve 22 or the degree of opening of the EGR valve 51 is set to the appropriate value, which provides the required flow rate of gas, and is maintained at that value for a predetermined time period. In this way, the temperature of the DPF 4 can be sufficiently reduced. Therefore, the rapid combustion of the collected particulates, which are collected by the DPF 4, is no longer likely to occur, and the above-described normal regeneration control operation of the DPF 4 is performed. Thus, the DPF 4 is safely and reliably regenerated, resulting in improvement of safety and durability of the DPF 4.

(Seventh Embodiment)

Figure 11:
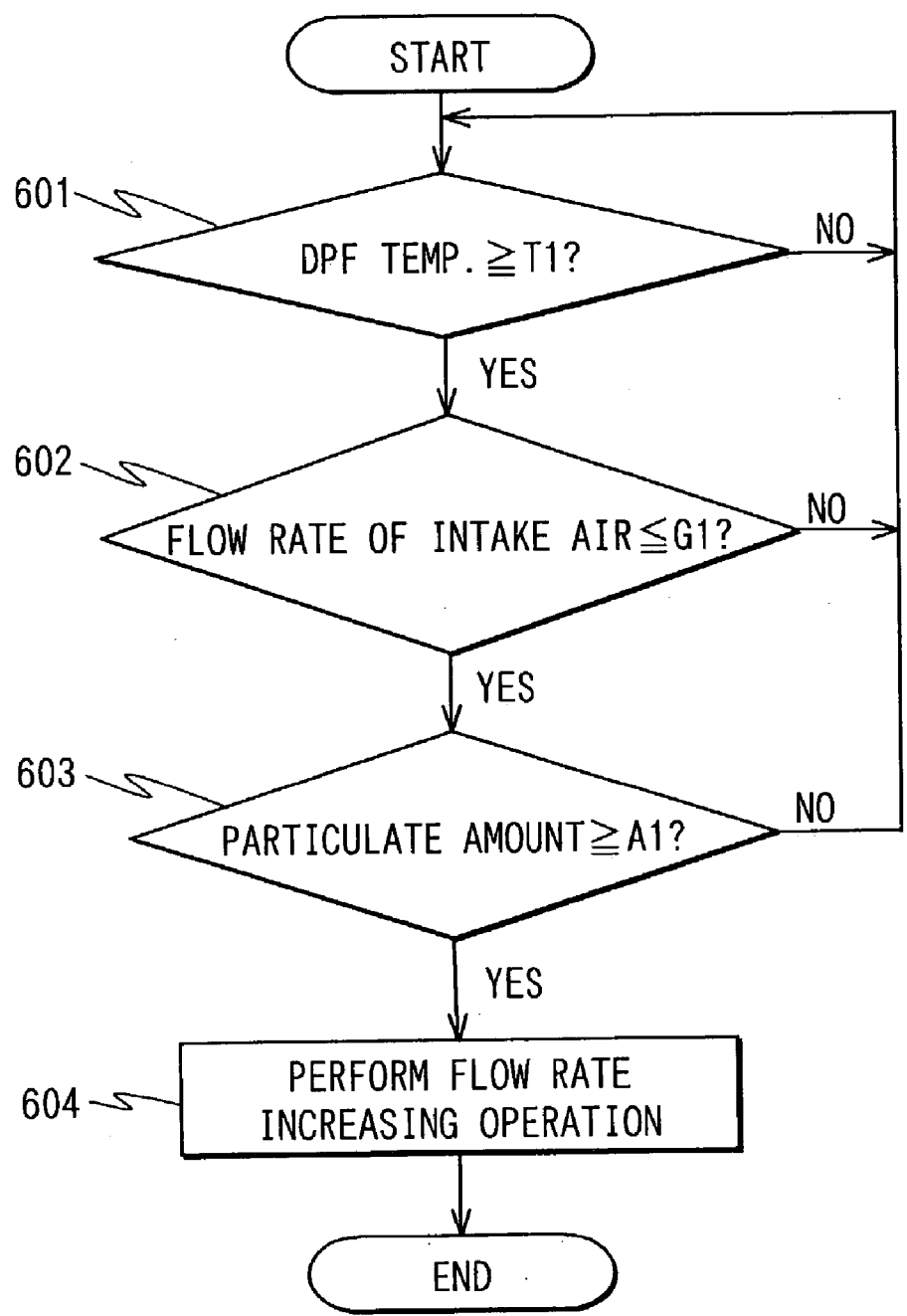
FIG. 11 is a flow chart showing control operation of the ECU of the exhaust gas filtering system according to a seventh embodiment of the present invention.

A seventh embodiment of the present invention will be described with reference to FIG. 11. A structure of an exhaust gas filtering system according to the seventh embodiment is substantially the same as that of the first embodiment and thus will not be depicted. In the present embodiment, the flow rate increasing control operation for increasing the flow rate of gas supplied to the DPF 4 is performed when the following conditions are all satisfied:

based on the operating state of the engine 1 detected by the ECU 7, it is determined that rapid combustion of the collected particulates, which are collected by the DPF 4, is likely to occur;

the temperature of the DPF 4 is equal to or greater than the threshold value T1;

the flow rate of intake air is equal to or less than the threshold value G1; and the collected particulate amount of the DPF 4 is equal to or greater than the threshold value A1.

A flow chart of the above operation performed by the ECU 7 will be described with reference to FIG. 11. First, at step 601, it is determined by the ECU 7 whether the temperature of the DPF 4 is equal to or greater than the threshold value T1. When it is determined that the temperature of the DPF 4 is equal to or greater than the threshold value T1 at step 601, control proceeds to step 602. At step 602, it is determined whether the flow rate of intake air is equal to or less than the threshold value G1. When it is determined that the flow rate of intake air is equal to or less than the threshold value G1 at step 602, control proceeds to step 603. At step 603, it is determined whether the collected particulate amount computed by the particulate amount computing means is equal to or greater than the predetermined amount (the threshold value A1), which likely causes the rapid combustion of the collected particulates. When it is determined that the collected particulate amount is equal to or greater than the threshold value A1 at step 603, control proceeds to step 604. When "NO" is returned at any of steps 601, 602, 603, control returns to "START" in FIG. 11.

At step 604, the flow rate increasing control operation for increasing the flow rate of gas supplied to the DPF 4 is performed in the manner similar to that of the first embodiment to reduce the temperature of the DPF 4. In the present embodiment, the flow rate increasing control operation is performed only when the collected particulate amount of the DPF 4 reaches the predetermined amount (threshold value A1), which likely causes the rapid combustion of the collected particulates. Thus, advantages similar to those described above can be more efficiently achieved.

(Eighth Embodiment)

Figure 12:
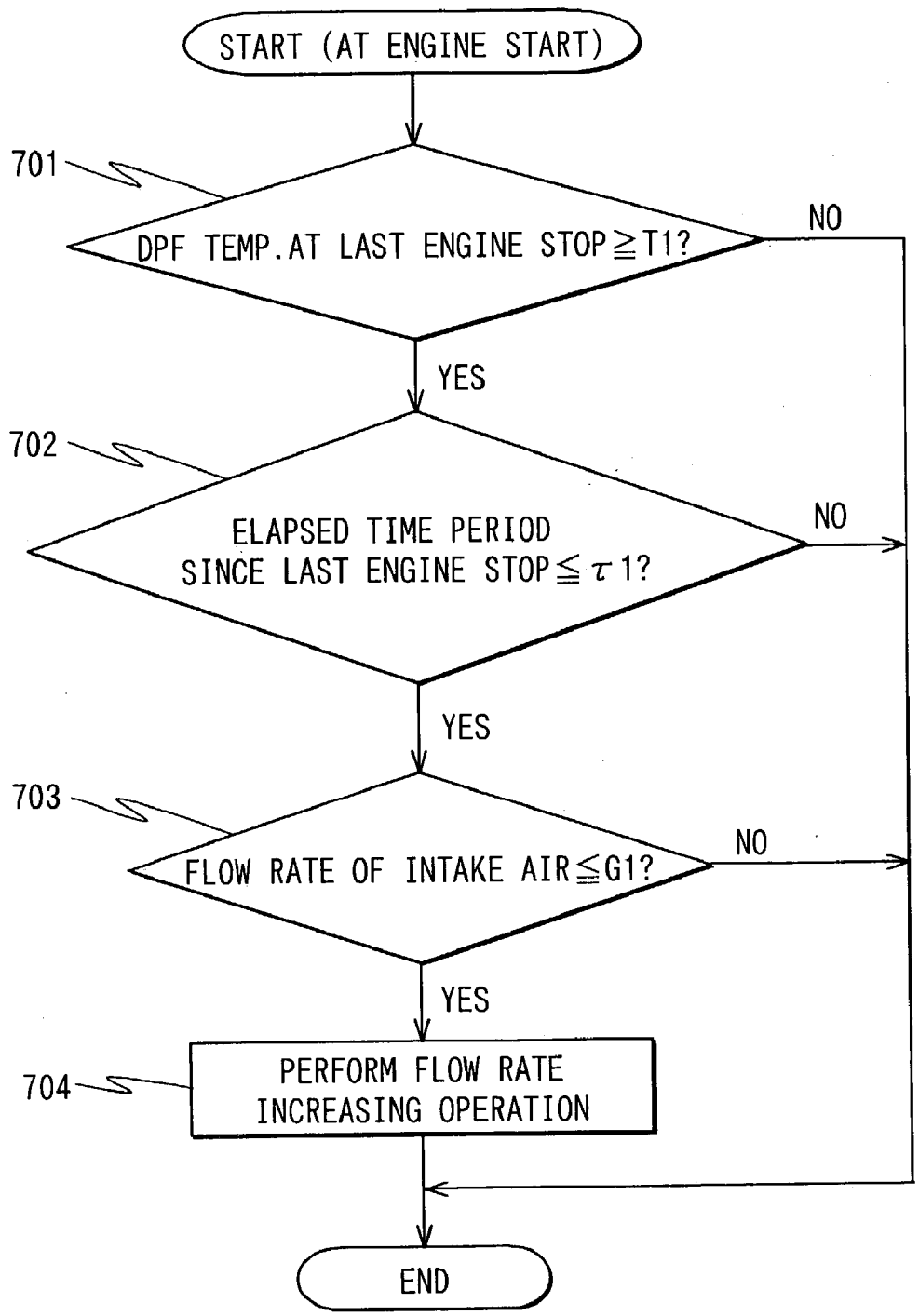
FIG. 12 is a flow chart showing control operation of the ECU of the exhaust gas filtering system according to an eighth embodiment of the present invention.

An eighth embodiment of the present invention will be described with reference to FIG. 12. A structure of an exhaust gas filtering system according to the eighth embodiment is substantially the same as that of the first embodiment and thus will not be depicted. In the present embodiment, the flow rate increasing control operation for increasing the flow rate of gas supplied to the DPF 4 is performed when the following conditions are all satisfied:

based on the operating state of the engine 1 detected by the ECU 7, it is determined that the engine 1 is stopped under a high temperature condition of the DPF 4, at which the temperature of the DPF 4 is equal to or greater than the threshold value T1, and is restarted immediately thereafter; and the flow rate of intake air is not sufficient.

A flow chart of the above operation performed by the ECU 7 will be described with reference to FIG. 12. This operation starts at the time of cranking or starting of the engine 1 (at the time of engine start). That is, this operation starts at the time of turning on of an ignition switch. At step 701, it is determined by the ECU 7 whether the temperature of the DPF 4 is equal to or greater than the threshold value T1 at the time of last engine stop. When it is determined that the temperature of the DPF 4 is equal to or greater than the threshold value T1 at step 701, control proceeds to step 702. At step 702, it is determined whether an elapsed time period between the last engine stop and the current engine start is equal to or less than a predetermined time period (i.e., a corresponding combustible state threshold value) $\tau1$. When it is determined that the elapsed time period between the last engine stop and the current engine start is equal to or less than the time period $\tau1$ at step 702, control proceeds to step 703. At step 703, it is determined whether the flow rate of intake air is equal to or less than the threshold value G1. When it is determined that the flow rate of intake air is equal to or less than the threshold value G1 at step 703, control proceeds to step 704. When "NO" is returned at any of steps 701, 702, 703, the current flow ends.

At step 704, the flow rate increasing control operation for increasing the flow rate of gas supplied to the DPF 4 is performed in the manner similar to that of the first embodiment to reduce the temperature of the DPF 4. In the present embodiment, as described above, the flow rate increasing control operation for increasing the flow rate of gas supplied to the DPF 4 is performed when the following conditions are all satisfied:

the engine 1 is stopped under the high temperature condition of the DPF 4, at which the temperature of the DPF 4 is equal to or greater than the threshold value T1, and is restarted before elapse of sufficient time for cooling the DPF 4; and the flow rate of intake air is not sufficient. Thus, the rapid combustion of the collected particulates of the DPF 4 can be avoided.

(Ninth Embodiment)

Figure 13:
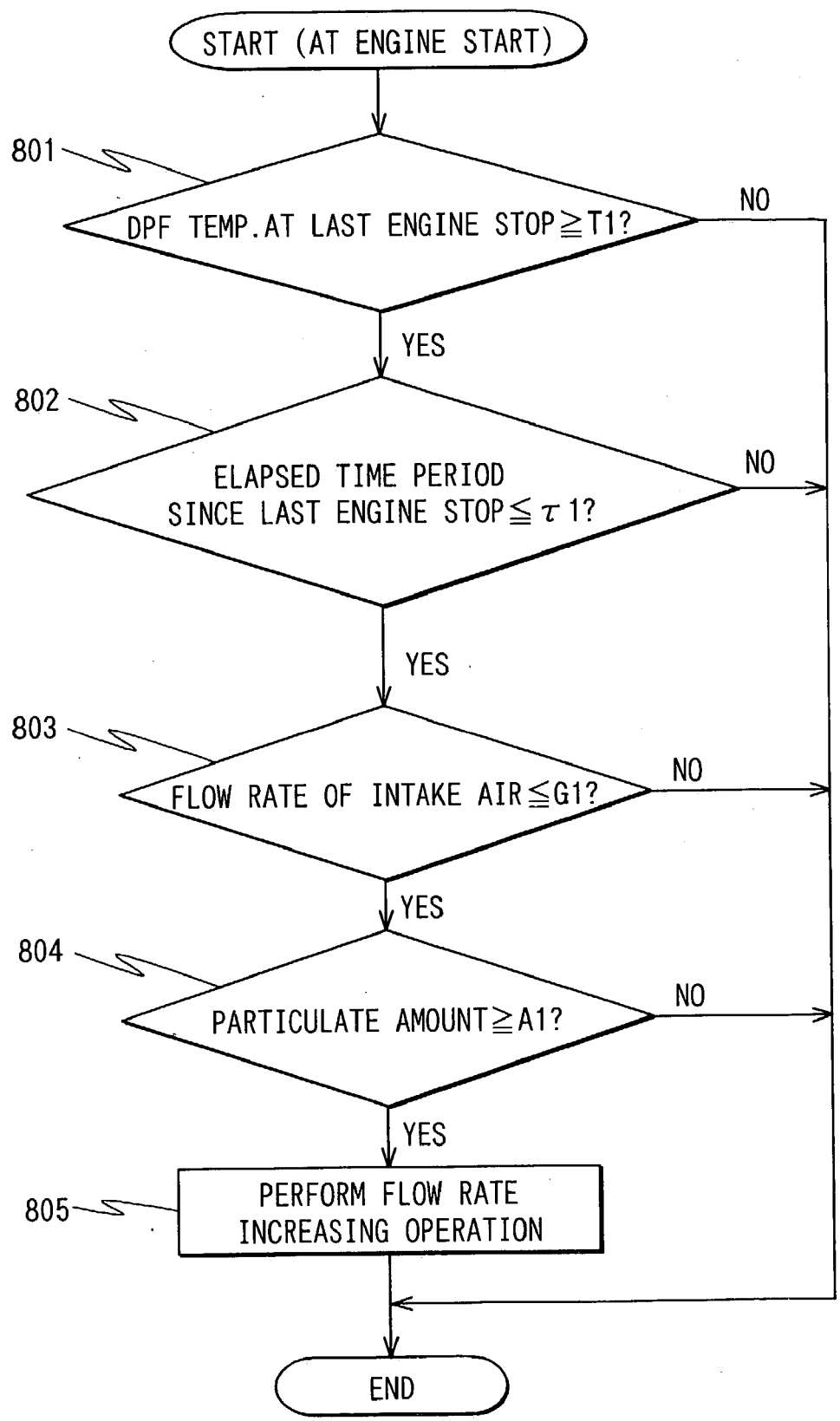
FIG. 13 is a flow chart showing control operation of the ECU of the exhaust gas filtering system according to a ninth embodiment of the present invention.

A ninth embodiment of the present invention will be described with reference to FIG. 13. A structure of an exhaust gas filtering system according to the ninth embodiment is substantially the same as that of the first embodiment and thus will not be depicted. In the present embodiment, the flow rate increasing control operation for increasing the flow rate of gas supplied to the DPF 4 is performed when the following conditions are all satisfied:

based on the operating state of the engine 1 detected by the ECU 7, it is determined that the engine 1 is stopped under a high temperature condition of the DPF 4, at which the temperature of the DPF 4 is equal to or greater than the threshold value T1, and is restarted immediately thereafter;

the flow rate of intake air is not sufficient; and an excessive amount of particulates, which likely causes rapid combustion of the particulates and thus could likely damage the DPF 4, is deposited in the DPF 4.

A flow chart of the above operation performed by the ECU 7 will be described with reference to FIG. 13. At step 801, it is determined by the ECU 7 whether the temperature of the DPF 4 is equal to or greater than the threshold value T1 at the time of last engine stop. When it is determined that the temperature of the DPF 4 is equal to or greater than the threshold value T1 at step 801, control proceeds to step 802. At step 802, it is determined whether an elapsed time period between the last engine stop and the current engine start is equal to or less than the predetermined time period τ1. When it is determined that the elapsed time period between the last engine stop and the current engine start is equal to or less than the time period T1 at step 802, control proceeds to step 803. At step 803, it is determined whether the flow rate of intake air is equal to or less than the threshold value G1. When it is determined that the flow rate of intake air is equal to or less than the threshold value G1 at step 803, control proceeds to step 804. At step 804, it is determined whether the collected particulate amount, which is computed by the particulate amount computing means, is equal to or greater than the predetermined amount (i.e., the threshold value A1), which likely causes the rapid combustion of the collected particulates. When it is determined that the collected particulate amount is equal to or greater than the threshold value A1 at step 804, control proceeds to step 805. When "NO" is returned at any of steps 801, 802, 803, 804, the current flow ends.

At step 805, the flow rate increasing control operation for increasing the flow rate of gas supplied to the DPF 4 is performed in the manner similar to that of the first embodiment to reduce the temperature of the DPF 4. In the present embodiment, the flow rate increasing control operation for increasing the flow rate of gas supplied to the DPF 4 is performed only when the collected particulate amount of the DPF 4 reaches the predetermined amount (i.e., the threshold value A1), which likely causes the rapid combustion of the collected particulates. Thus, the above-described advantages are more efficiently achieved.

(Tenth Embodiment)

Figure 14:
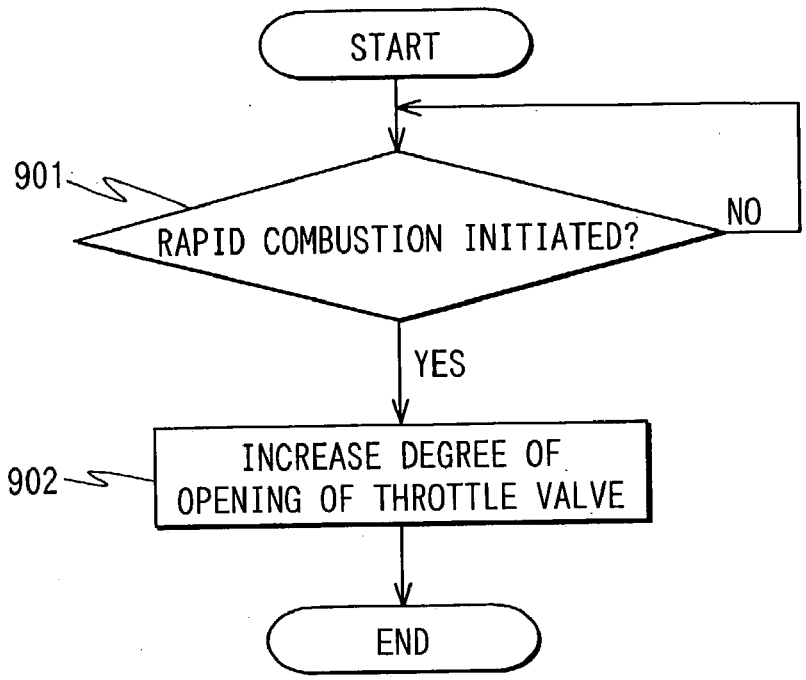
FIG. 14 is a flow chart showing control operation of the ECU of the exhaust gas filtering system according to a tenth embodiment of the present invention.

A tenth embodiment of the present invention will be described with reference to FIG. 14. A structure of an exhaust gas filtering system according to the tenth embodiment is substantially the same as that of the first embodiment and thus will not be depicted. In each of the above-described embodiments, the flow rate increasing control operation for increasing the flow rate of gas supplied to the DPF 4 is performed when it is determined that the collected particulates are likely to be rapidly combusted according to the operating state of the engine 1 detected by the ECU 7. On the other hand, in the present embodiment, the flow rate increasing control operation for increasing the flow rate of gas supplied to the DPF 4 will be performed when it is determined that rapid combustion of the collected particulates is actually initiated (or rapid combustion of the collected particulates exists).

A flow chart of the above operation performed by the ECU 7 will be described with reference to FIG. 14. At step 901, it is determined by the ECU 7 whether the rapid combustion of the collected particulates is initiated. When "YES" is returned at step 901, control proceeds to step 902.

At step 902, the degree of opening of the throttle valve 22 is increased in comparison to the normal degree of opening of the throttle valve 22 that is set for the normal operating period of the exhaust gas filtering system, i.e., for the non-regenerating period of the DPF 4 to increase the flow rate of gas supplied to the DPF 4. In this way, the flow rate of intake air supplied to the engine 1 is increased, and thus the relatively large amount of exhaust gas is supplied to the DPF 4 to remove heat from the DPF 4. Therefore, combustion of the collected particulates cannot be maintained, and thus the combustion of the collected particulates stops. As described above, the initiation of the rapid combustion of the collected particulates can be determined based on a change in the temperature of the DPF 4 or a change in the oxygen concentration to perform the flow rate increasing control operation for increasing the flow rate of gas supplied to the DPF 4. In this way, the rapid combustion of the collected particulates can be reliably stopped, and the safety of the DPF 4 can be improved.

(Eleventh Embodiment)

Figure 15:
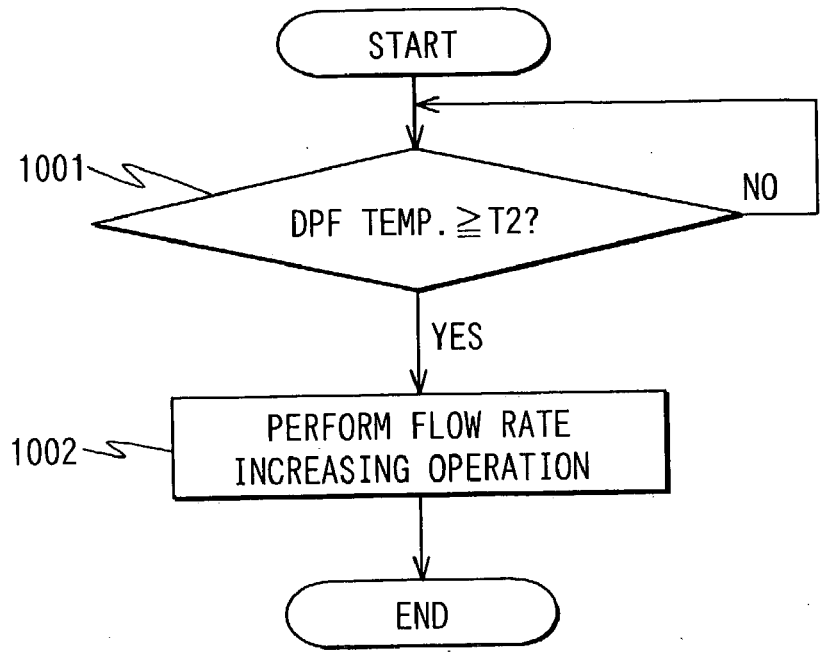
FIG. 15 is a flow chart showing control operation of the ECU of the exhaust gas filtering system according to an eleventh embodiment of the present invention.

An eleventh embodiment of the present invention will be described with reference to FIG. 15. The determination of the initiation of the rapid combustion of the particulates (step 901) is performed in a different way according to the eleventh embodiment. Control operation performed by the ECU 7 is shown in FIG. 15. At step 1001, it is determined by the ECU 7 whether the temperature of the DPF 4 is increased to a level equal to or greater than a corresponding combusting state threshold value T2 (T2>T1). When it is determined that the temperature of the DPF 4 is increased to a level equal to or greater than the threshold value T2 (T2>T1), control proceeds to step 1002. When "NO" is returned at step 1001, control returns to "START" in FIG. 15.

At step 1002, the flow rate increasing control operation for increasing the flow rate of gas supplied to the DPF 4 is performed to reduce the temperature of the DPF 4. The flow rate increasing control operation can be achieved in the various ways, as described with respect to the first embodiment.

When the temperature of the DPF 4 is increased to the level, at which the rapid combustion of the collected particulates is expected, the flow rate increasing control operation for increasing the flow rate of gas supplied to the DPF 4 is performed. Thus, spreading of the rapid combustion of the collected particulates in the DPF 4 can be limited.

(Twelfth Embodiment)

Figure 16:
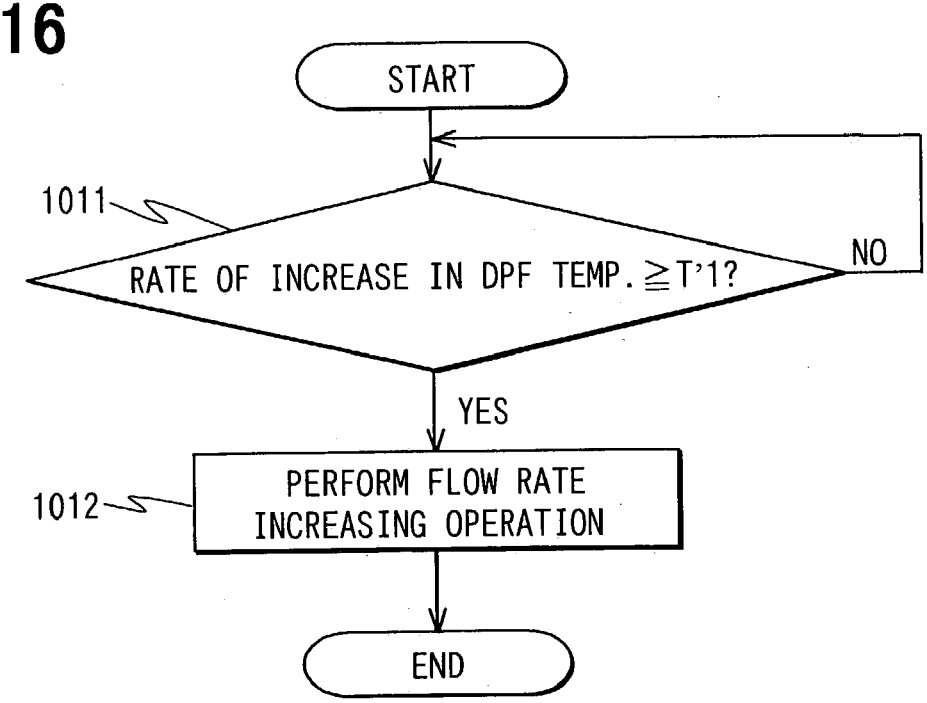
FIG. 16 is a flow chart showing control operation of the ECU of the exhaust gas filtering system according to a twelfth embodiment of the present invention.

A twelfth embodiment of the present invention, in which the flow rate increasing control operation is performed when the ECU 7 determines that the rapid combustion of the collected particulates is initiated, will be described with reference to FIG. 16. A structure of an exhaust gas filtering system according to the twelfth embodiment is substantially the same as that of the first embodiment and thus will not be depicted. In the present embodiment, when a rate of increase in the temperature of the DPF 4 with respect to time (hereinafter, referred to as "rate of increase in the DPF temperature") is equal to or greater than a corresponding combusting state threshold value T'1, the flow rate increasing control operation for increasing the flow rate of gas supplied to the DPF 4 is performed.

A flow chart of the operation performed by the ECU 7 will be described with reference to FIG. 16. At step 1011, it is determined by the ECU 7 whether the rate of increase in the DPF temperature is equal to or greater than the threshold value T'1. When it is determined that the rate of increase in the DPF temperature is equal to or greater than the threshold value T'1, control proceeds to step 1012. In this embodiment, for example, the temperature of the DPF 4 is periodically measured and is supplied to the ECU 7, and the rate of increase in the DPF temperature is determined based on a difference between the currently measured temperature of the DPF 4 and the previously measured temperature of the DPF 4. When "NO" is returned at step 1011, control returns to "START" in FIG. 16.

At step 1012, the flow rate increasing control operation for increasing the flow rate of gas supplied to the DPF 4 is performed in the manner similar to that of the first embodiment to reduce the temperature of the DPF 4.

When the rapid combustion of the collected particulates is initiated, exhaust gas receives a relatively large amount of heat of combustion, so that the temperature of the DPF 4 is rapidly increased. When the rate of increase in the DPF temperature becomes equal to or greater than the threshold value T'1, the flow rate increasing control operation for increasing the flow rate of gas supplied to the DPF 4 is performed. Thus, spreading of the rapid combustion of the collected particulates in the DPF 4 can be limited.

(Thirteenth Embodiment)

Figure 17:
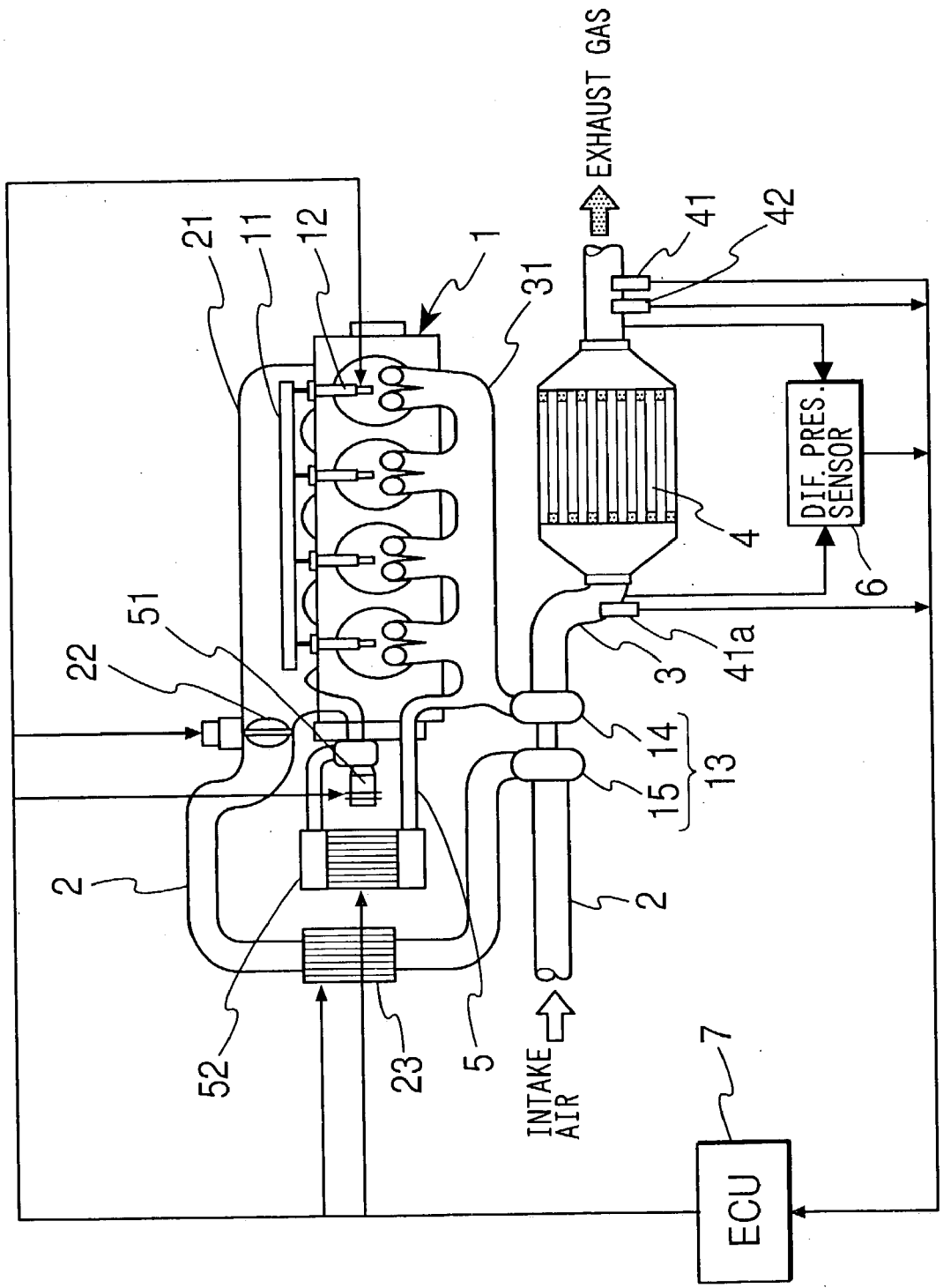
FIG. 17 is a schematic view of an exhaust gas filtering system for an internal combustion engine according to a thirteenth embodiment of the present invention.

A thirteenth embodiment of the present invention, in which the flow rate increasing control operation is performed when the ECU 7 determines that the rapid combustion of the collected particulates is initiated, will be described with reference to FIG. 17. A structure of an exhaust gas filtering system according to the thirteenth embodiment is substantially the same as that of the first embodiment except an additional exhaust gas temperature sensor 41a arranged upstream of the DPF 4 in addition to the temperature sensor 41 arranged downstream of the DPF 4. In the present embodiment, when a temperature difference (hereinafter, referred to as "DPF inlet-outlet gas temperature difference") between the temperature (hereinafter, referred to as "DPF outlet gas temperature") at the downstream side of the DPF 4 and the temperature (hereinafter, referred to as "IDPF inlet gas temperature") at the upstream side of the DPF 4 is equal to or greater than a combusting state threshold value $\Delta T1$, the flow rate increasing control operation for increasing the flow rate of gas supplied to the DPF 4 is performed. Here, DPF inlet-outlet gas temperature difference is obtained by subtracting the DPF inlet temperature from the DPF outlet temperature.

Figure 18:
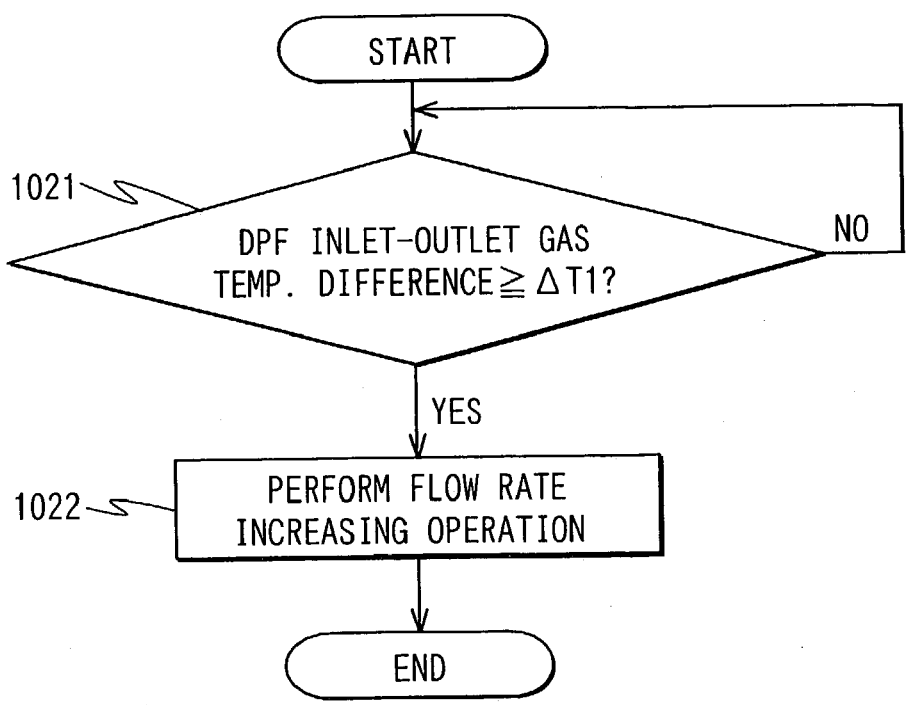
FIG. 18 is a flow chart showing control operation of the ECU of the exhaust gas filtering system according to the thirteenth embodiment of the present invention.

A flow chart of the operation performed by the ECU 7 will be described with reference to FIG. 18. At step 1021, it is determined by the ECU 7 whether the DPF inlet-outlet gas temperature difference is equal to or greater than the threshold value $\Delta T1$. When it is determined that the DPF inlet-outlet gas temperature difference is equal to or greater than the threshold value $\Delta T1$ at step 1021, control proceeds to step 1022. When "NO" is returned at step 1021, control returns to "START" in FIG. 18.

At step 1022, the flow rate increasing control operation for increasing the flow rate of gas supplied to the DPF 4 is performed in the manner similar to that of the first embodiment to reduce the temperature of the DPF 4.

When the rapid combustion is initiated, the DPF outlet gas temperature is substantially increased by the heat of combustion relative to the DPF inlet gas temperature. When the DPF inlet-outlet gas temperature difference becomes equal to or greater than the threshold value $\Delta T1$, the flow rate increasing control operation for increasing the flow rate of gas supplied to the DPF 4 is performed. Thus, spreading of the rapid combustion of the collected particulates in the DPF 4 can be limited.

(Fourteenth Embodiment)

Figure 19:
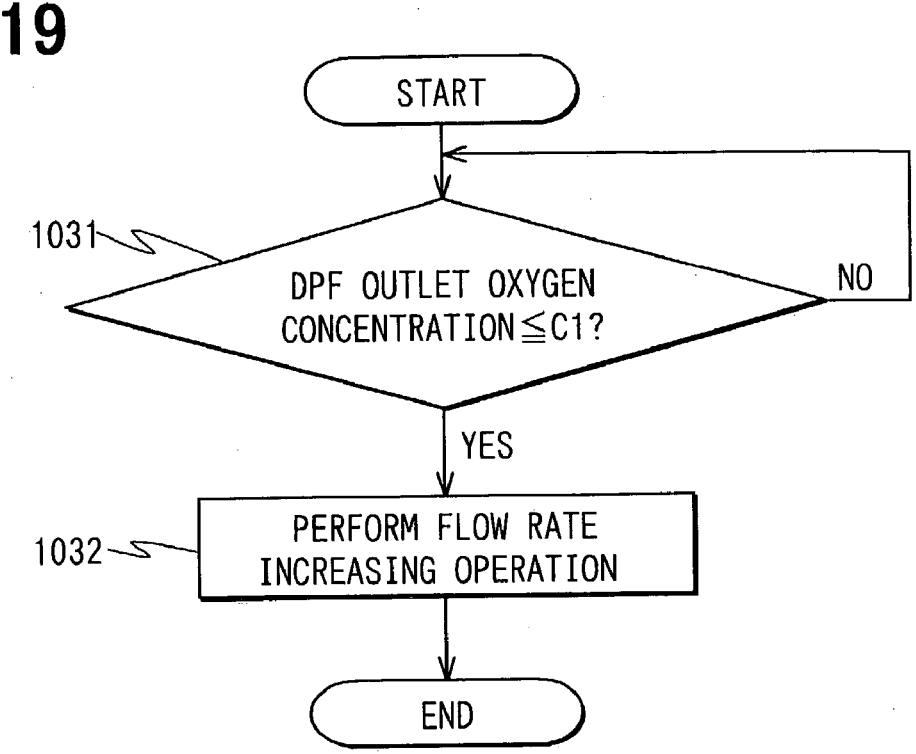
FIG. 19 is a flow chart showing control operation of the ECU of the exhaust gas filtering system according to a fourteenth embodiment of the present invention.

A fourteenth embodiment of the present invention, in which the flow rate increasing control operation is performed when the ECU 7 determines that the rapid combustion of the collected particulates is initiated, will be described with reference to FIG. 19. A structure of an exhaust gas filtering system according to the fourteenth embodiment is substantially the same as that of the first embodiment and thus will not be depicted. In the present embodiment, when the oxygen concentration (hereinafter, referred to as "DPF outlet oxygen concentration") in gas at the downstream side of the DPF 4 is equal to or less than a predetermined concentration (a corresponding combusting state threshold value) C1, at which initiation of the rapid combustion of the collected particulates is expected, the flow rate increasing control operation for increasing the flow rate of gas supplied to the DPF 4 is performed.

A flow chart of the operation performed by the ECU 7 will be described with reference to FIG. 19. At step 1031, it is determined by the ECU 7 whether the DPF outlet oxygen concentration is equal to or less than the threshold value C1. When it is determined that the DPF outlet oxygen concentration is equal to or less than the threshold value C1 at step 1031, control proceeds to step 1032. When "NO" is returned at step 1031, control returns to "START" in FIG. 19.

At step 1032, the flow rate increasing control operation for increasing the flow rate of gas supplied to the DPF 4 is performed in the manner similar to that of the first embodiment to reduce the temperature of the DPF 4.

When the rapid combustion of the collected particulates is initiated, the oxygen concentration at the downstream side of the DPF 4 is rapidly decreased. When the oxygen concentration at the downstream side of the DPF 4 reaches the level, at which the initiation of the rapid combustion of the particulates is expected, the flow rate increasing control operation for increasing the flow rate of gas supplied to the DPF 4 is performed. Thus, spreading of the rapid combustion of the collected particulates in the DPF 4 can be limited.

(Fifteenth Embodiment)

Figure 20:
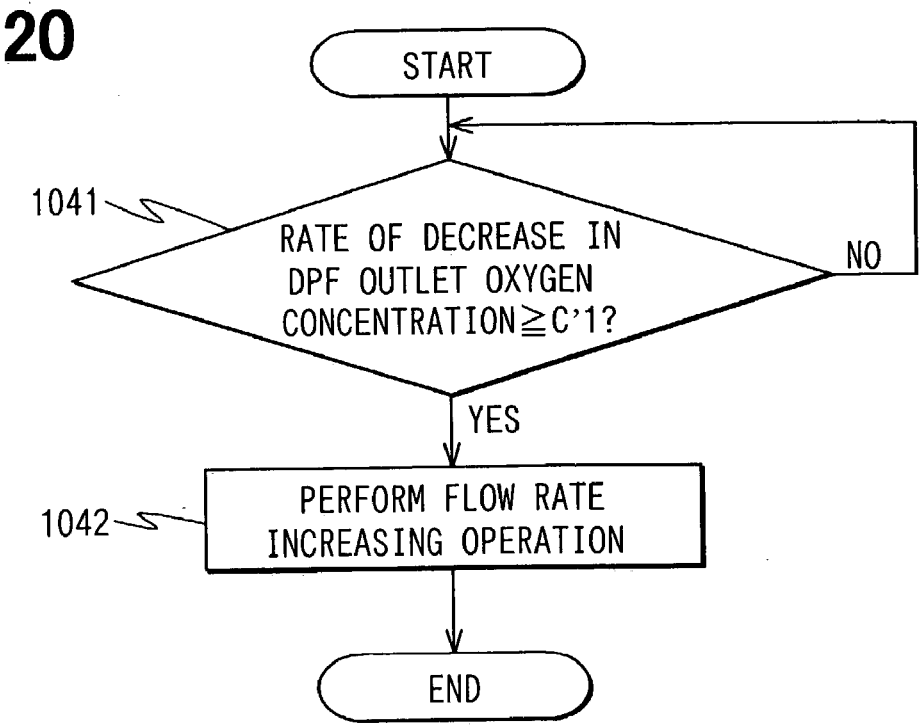
FIG. 20 is a flow chart showing control operation of the ECU of the exhaust gas filtering system according to a fifteenth embodiment of the present invention.

A fifteenth embodiment of the present invention, in which the flow rate increasing control operation is performed when the ECU 7 determines that the rapid combustion of the collected particulates is initiated, will be described with reference to FIG. 20. A structure of an exhaust gas filtering system according to the fifteenth embodiment is substantially the same as that of the first embodiment and thus will not be depicted. In the present embodiment, when a rate of decrease in the DPF outlet oxygen concentration is equal to or greater than a corresponding combusting state threshold value C'1, the flow rate increasing control operation for increasing the flow rate of gas supplied to the DPF 4 is performed.

A flow chart of the operation performed by the ECU 7 will be described with reference to FIG. 20. At step 1041, it is determined by the ECU 7 whether the rate of decrease in the DPF outlet oxygen concentration is equal to or greater than the threshold value C'1. When it is determined that the rate of decrease in the DPF outlet oxygen concentration is equal to or greater than the threshold value C'1 at step 1041, control proceeds to step 1042. In this embodiment, the DPF outlet oxygen concentration is periodically measured and is supplied to the ECU 7, and the rate of decrease in the DPF outlet oxygen concentration is determined based on a difference between the currently measured DPF outlet oxygen concentration and the previously measured DPF outlet oxygen concentration. When "NO" is returned at step 1041, control returns to "START" in FIG. 20.

At step 1042, the flow rate increasing control operation for increasing the flow rate of gas supplied to the DPF 4 is performed in the manner similar to that of the first embodiment to reduce the temperature of the DPF 4.

When the rapid combustion of the collected particulates is initiated, a relatively large amount of oxygen is consumed by the combustion, so that the DPF outlet oxygen concentration is rapidly decreased. When the rate of decrease in the DPF outlet oxygen concentration becomes equal to or greater than the threshold value C'1, the flow rate increasing control operation for increasing the flow rate of gas supplied to the DPF 4 is performed. Thus, spreading of the rapid combustion of the collected particulates in the DPF 4 can be limited.

(Sixteenth Embodiment)

Figure 21:
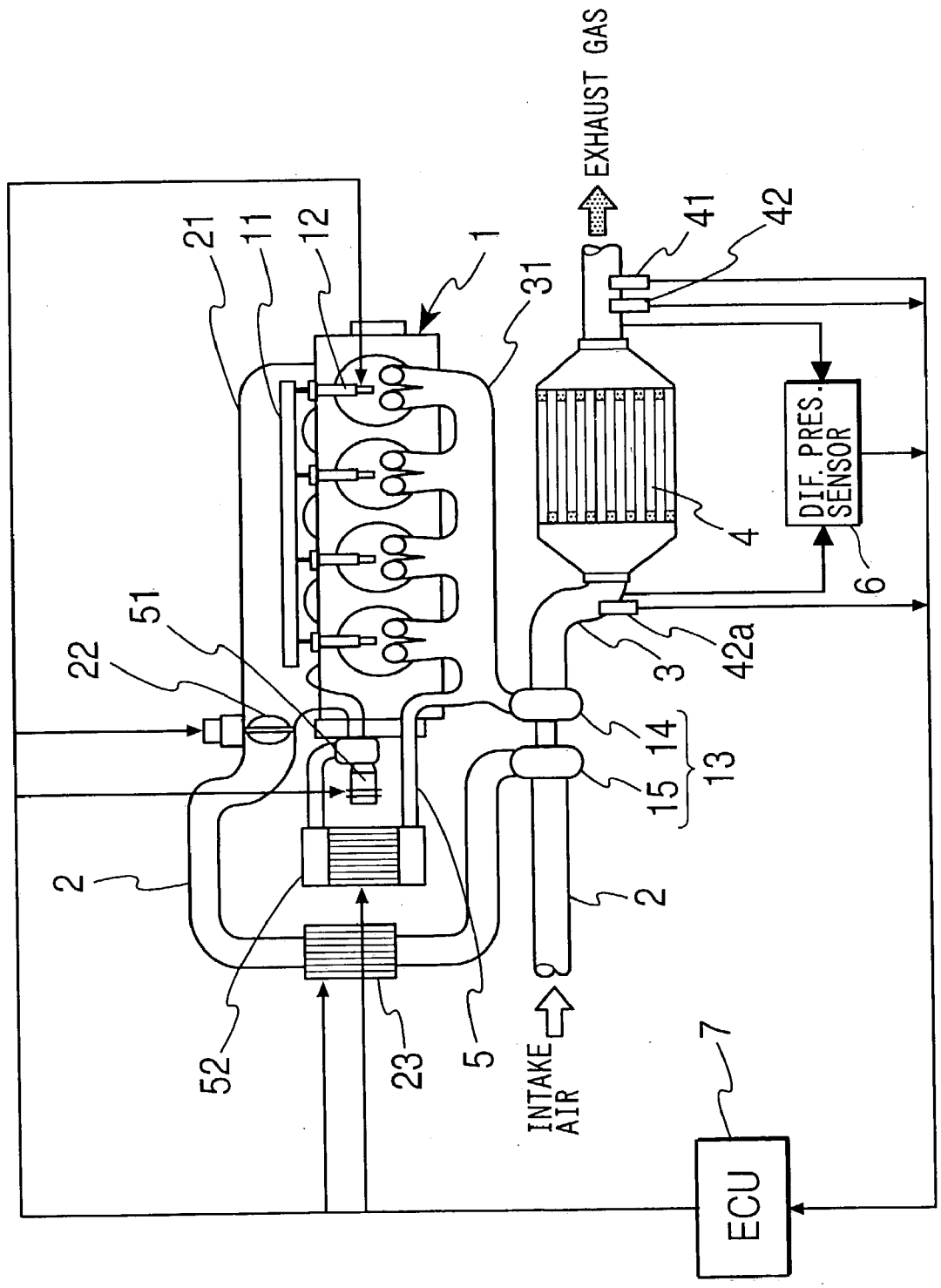
FIG. 21 is a schematic view of an exhaust gas filtering system for an internal combustion engine according to a sixteenth embodiment of the present invention.

A sixteenth embodiment of the present invention, in which the flow rate increasing control operation is performed when the ECU 7 determines that the rapid combustion of the collected particulates is initiated, will be described with reference to FIG. 21. A structure of an exhaust gas filtering system according to the sixteenth embodiment is substantially the same as that of the first embodiment except an additional A/F sensor 42a arranged upstream of the DPF 4 in addition to the A/F sensor 42 arranged downstream of the DPF 4. In the present embodiment, when an oxygen concentration difference (hereinafter, referred to as "DPF inlet-outlet oxygen concentration difference") between the DPF outlet oxygen concentration at the downstream side of the DPF 4 and the oxygen concentration (hereinafter, referred to as "DPF inlet oxygen concentration") at the upstream side of the DPF 4 is equal to or greater than a combusting state threshold value $\Delta C1$, the flow rate increasing control operation for increasing the flow rate of gas supplied to the DPF 4 is performed. Here, the DPF inlet-outlet oxygen concentration difference is obtained by subtracting the DPF outlet oxygen concentration from the DPF inlet oxygen concentration.

Figure 22:
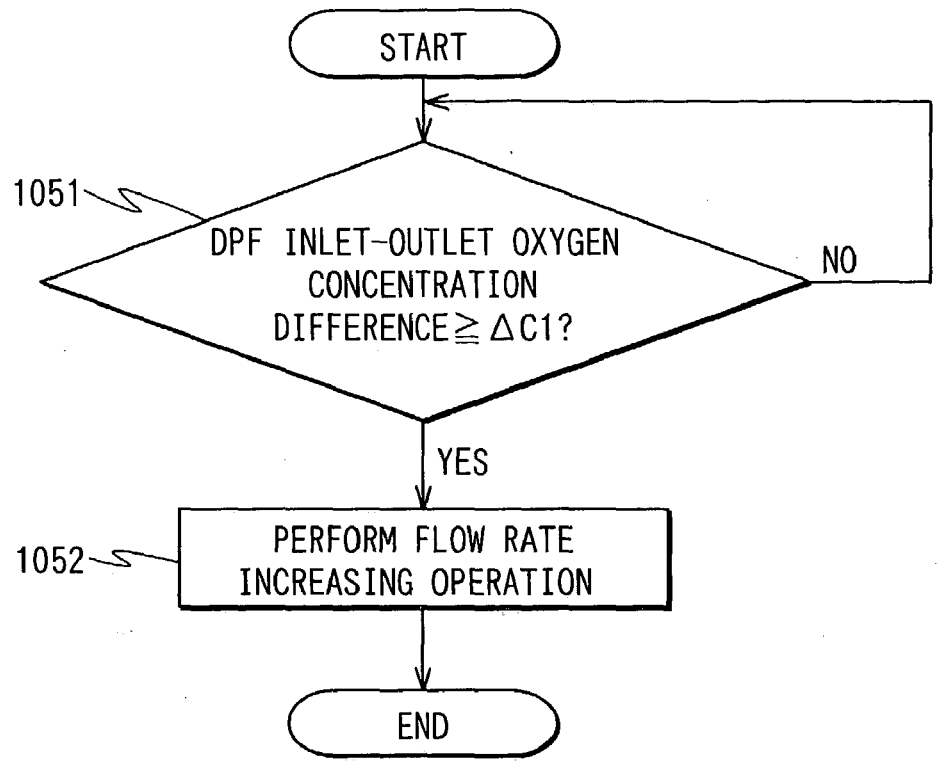
FIG. 22 is a flow chart showing control operation of the ECU of the exhaust gas filtering system according to the sixteenth embodiment of the present invention.

A flow chart of the operation performed by the ECU 7 will be described with reference to FIG. 22. At step 1051, it is determined by the ECU 7 whether the DPF inlet-outlet oxygen concentration difference is equal to or greater than the threshold value $\Delta C1$. When it is determined that the DPF inlet-outlet oxygen concentration difference is equal to or greater than the threshold value $\Delta C1$ at step 1051, control proceeds to step 1052. When "NO" is returned at step 1051, control returns to "START" in FIG. 22.

At step 1052, the flow rate increasing control operation for increasing the flow rate of gas supplied to the DPF 4 is performed in the manner similar to that of the first embodiment to reduce the temperature of the DPF 4.

As described above, when the rapid combustion of the collected particulates is initiated, a relatively large amount of oxygen is consumed by the combustion, so that the DPF outlet oxygen concentration is substantially decreased relative to the DPF inlet oxygen concentration. When the DPF inlet-outlet oxygen concentration difference becomes equal to or greater than the threshold value $\Delta C1$, the flow rate increasing control operation for increasing the flow rate of gas supplied to the DPF 4 is performed. Thus, spreading of the rapid combustion of the collected particulates in the DPF 4 can be limited.

Figure 23:
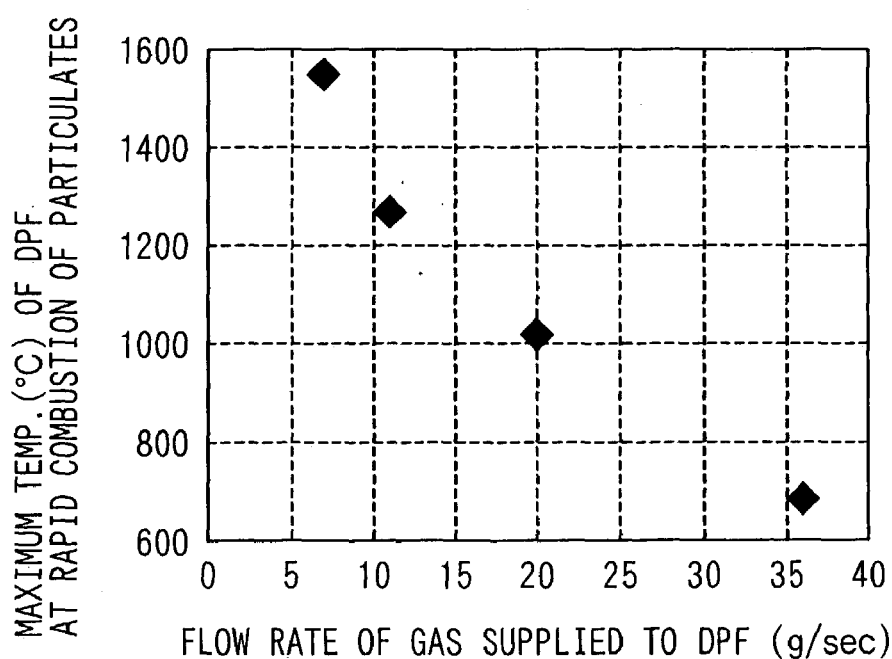
FIG. 23 is a graph showing relationship between a flow rate of gas supplied to a particulate filter and maximum temperature of the particulate filter at the time of rapid combustion of collected particulates collected by the particulate filter.

In each of the above embodiments, by increasing the flow rate of gas supplied to the DPF 4, damage of the DPF 4, which could be induced by the rapid combustion of the collected particulates, is restrained. FIG. 23 shows relationship between the flow rate of gas supplied to the DPF 4 and the maximum temperature of the DPF 4 at the time of the rapid combustion of the collected particulates. The experimental result shown in FIG. 23 is obtained while the same amount of the collected particulates is used throughout the experiment. As clearly shown in FIG. 23, when the flow rate of gas supplied to the DPF 4 is increased, the maximum temperature of the DPF 4 is reduced. This advantageously restrains damage of the DPF 4 induced by the rapid combustion of the collected particulates.

(Seventeenth Embodiment)

Figure 24:
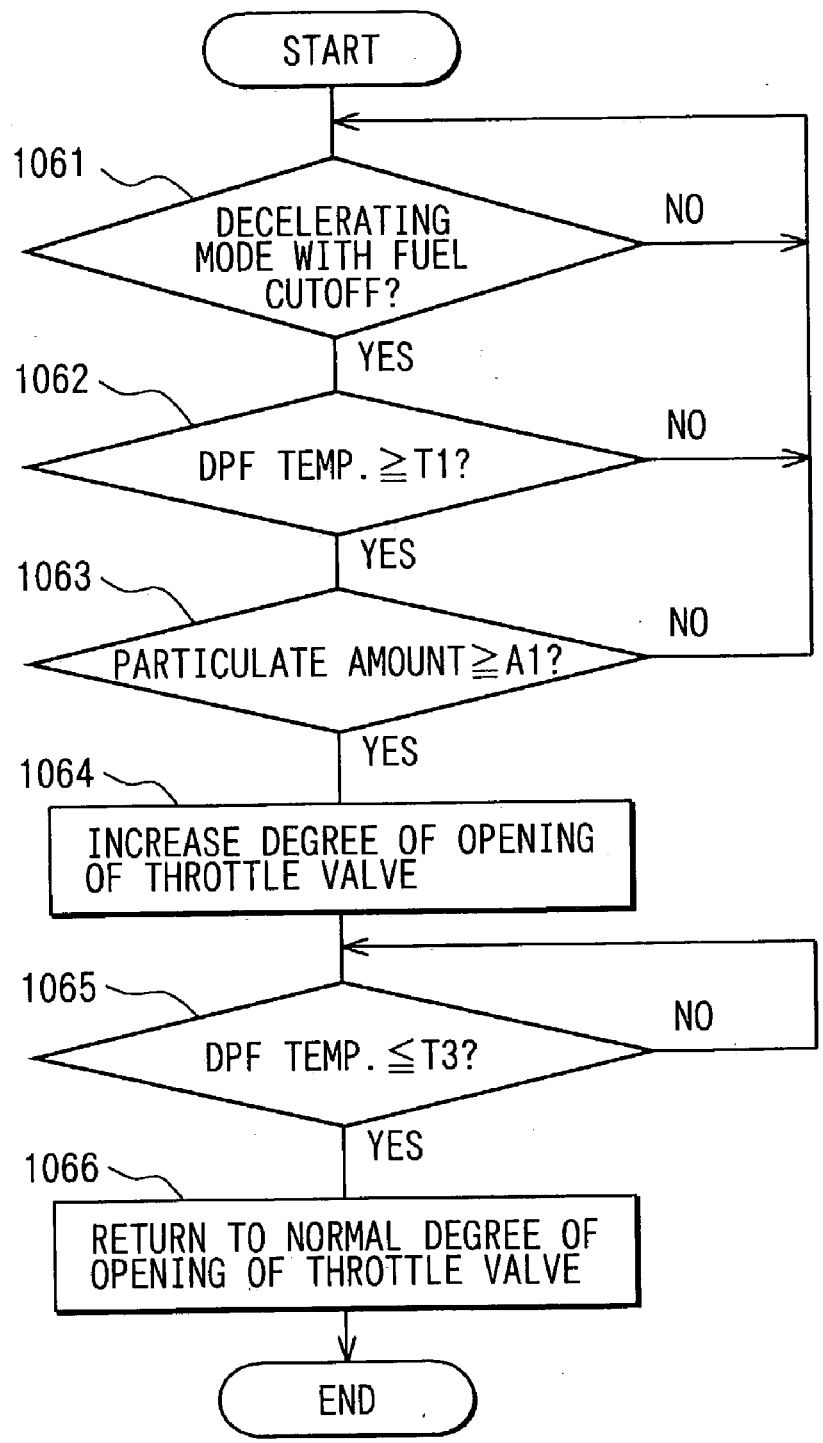
FIG. 24 is a flow chart showing control operation of the ECU of the exhaust gas filtering system according to a seventeenth embodiment of the present invention.

A seventeenth embodiment of the present invention will be described with reference to FIG. 24. A structure of an exhaust gas filtering system according to the seventeenth embodiment is substantially the same as that of the first embodiment and thus will not be depicted. In the present embodiment, when the temperature of the DPF 4 begins to decrease, more specifically, when the temperature of the DPF 4 becomes equal to or less than a threshold value T3 (T1>T3) after initiation of the flow rate increasing control operation for increasing the flow rate of gas supplied to the DPF 4 upon existence of the relatively high possibility of rapid combustion of the collected particulates detected by the ECU 7 based on the operating state of the engine 1, control operation returns to the normal control operation.

A flow chart of the operation performed by the ECU 7 will be described with reference to FIG. 24. At step 1061, it is determined by the ECU 7 whether the engine 1 is in the decelerating operating mode that involves fuel cutoff. When it is determined that the engine 1 is in the decelerating operating mode that involves the fuel cutoff at step 1061, control proceeds to step 1062. At step 1062, it is determined whether the temperature of the DPF 4 is equal to or greater than the threshold value T1. When it is determined that the temperature of the DPF 4 is equal to or greater than the threshold value T1 at step 1062, control proceeds to step 1063. At step 1063, it is determined whether the collected particulate amount of the DPF 4 is equal to or greater than the threshold value A1. When it is determined that the collected particulate amount of the DPF 4 is equal to or greater than the threshold value A1 at step 1063, control proceeds to step 1064. When "NO" is returned at any of steps 1061, 1062, 1063, control returns to "START" in FIG. 24.

At step 1064, the degree of opening of the throttle valve 22 is increased in comparison to the normal degree of opening of the throttle valve 22 that is set for the normal operating period, i.e., for the non-regenerating period of the DPF 4 to increase the flow rate of gas supplied to the DPF 4. By increasing the flow rate of gas supplied to the DPF 4, the temperature of the DPF 4 is reduced. Next, control proceeds to step 1065 where it is determined whether the temperature of the DPF 4 is equal to or less than a predetermined temperature (non-combustible state threshold value T3, which is less than T1), at which the rapid combustion of the particulates is not likely to occur. When it is determined that the temperature of the DPF 4 is equal to or less than the threshold value T3 at step 1065, control proceeds to step 1066. At step 1066, the degree of opening of the throttle valve 22 is returned to the normal degree of opening set for the normal operating period, and the current flow ends. When the temperature of the throttle valve 22 is controlled based on the temperature of the DPF 4 in the manner described above, more efficient and safer control operation is possible.

The present embodiment is not only applicable to the method for increasing the flow rate of gas by increasing the degree of opening of the throttle valve 22 but is also applicable to any of the above methods.

(Eighteenth Embodiment)

Figure 25:
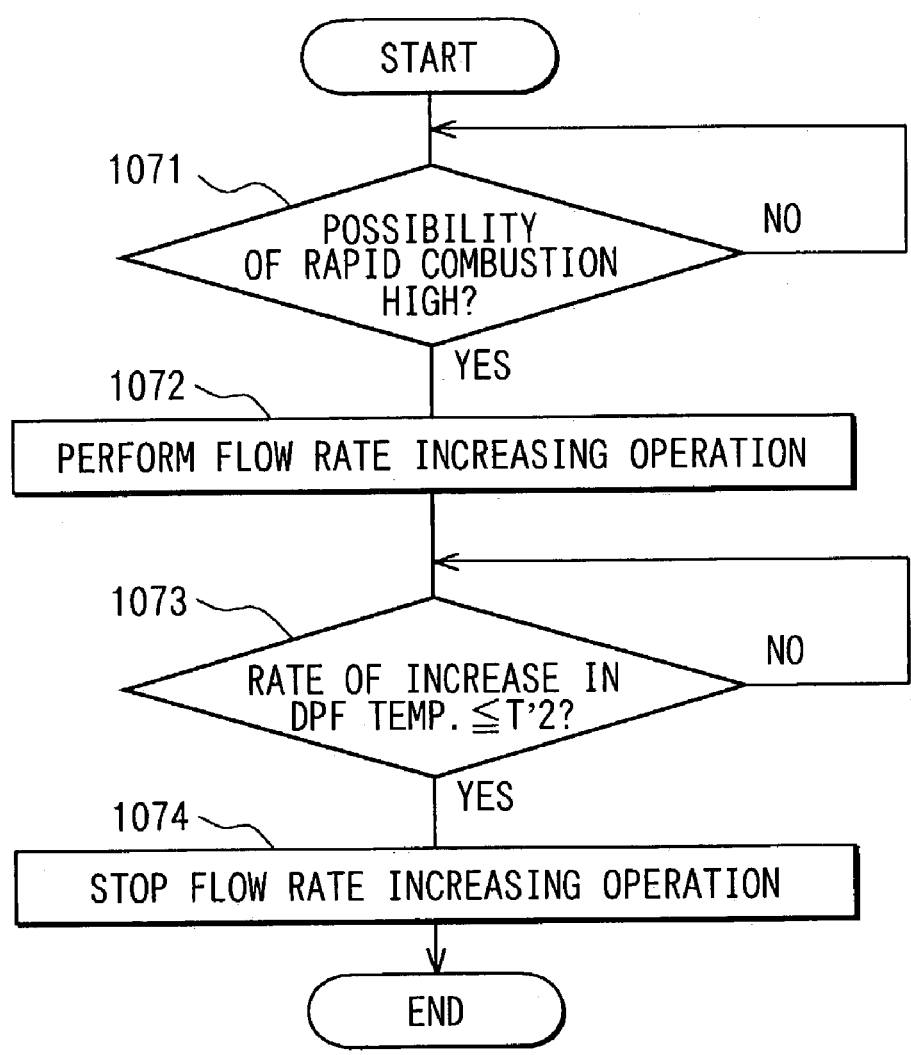
FIG. 25 is a flow chart showing control operation of the ECU of the exhaust gas filtering system according to an eighteenth embodiment of the present invention.

An eighteenth embodiment of the present invention will be described with reference to FIG. 25. A structure of an exhaust gas filtering system according to the eighteenth embodiment is substantially the same as that of the first embodiment and thus will not be depicted. In the present embodiment, when increase in the DPF 4 outlet gas temperature is alleviated, more specifically, when the rate of increase in the DPF outlet gas temperature becomes equal to or less than a non-combustible state threshold value T'2 (T'1>T'2) after initiation of the flow rate increasing control operation for increasing the flow rate of gas supplied to the DPF 4 upon existence of the relatively high possibility of rapid combustion of the collected particulates detected by the ECU 7 based on the operating state of the engine 1, control operation returns to the normal control operation.

A flow chart of the operation performed by the ECU 7 will be described with reference to FIG. 25. At step 1071, it is determined by the ECU 7 whether the relatively high possibility of rapid combustion of the collected particulates exists. When it is determined that relatively high possibility of rapid combustion of the collected particulates exist, control proceeds to step 1072. When "NO" is returned at step 1071, control repeats step 1071. At step 1072, the flow rate increasing control operation for increasing the flow rate of gas supplied to the DPF 4 is performed.

Next, at step 1073, it is determined whether the rate of increase in the DPF outlet gas temperature is equal to or less than the threshold value T'2. When it is determined that the rate of increase in the DPF outlet gas temperature is equal to or less than the threshold value T'2 at step 1073, control proceeds to step 1074. When "NO" is returned at step 1073, control repeats step 1073. At step 1074, the flow rate increasing control operation for increasing the flow rate of gas supplied to the DPF 4 is stopped.

(Nineteenth Embodiment)

Figure 26:
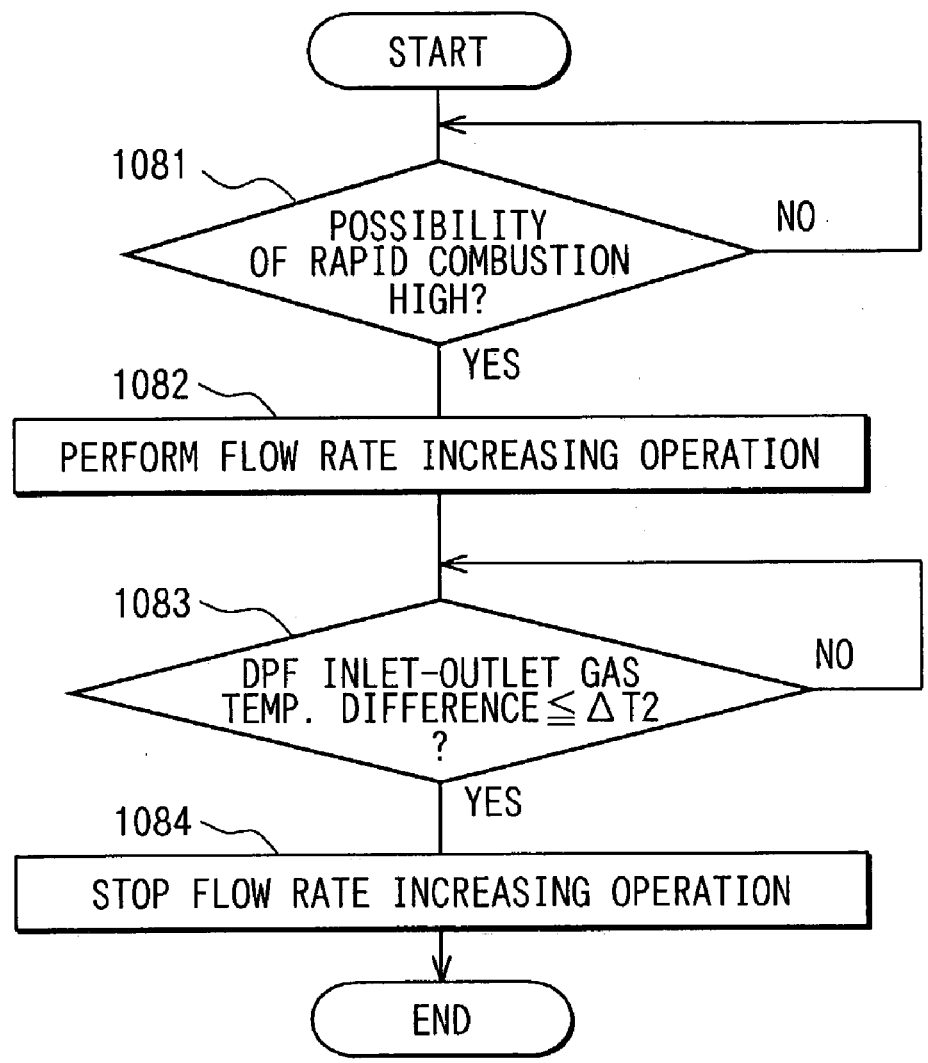
FIG. 26 is a flow chart showing control operation of the ECU of the exhaust gas filtering system according to a nineteenth embodiment of the present invention.

A nineteenth embodiment of the, present invention will be described with reference to FIG. 26. A structure of an exhaust gas filtering system according to the nineteenth embodiment is substantially the same as that of FIG. 17 and thus will not be depicted. In the present embodiment, when heating of exhaust gas in the DPF 4 is alleviated, more specifically, when the DPF inlet-outlet gas temperature difference becomes equal to or less than a non-combustible state threshold value ΔT2 (ΔT1>ΔT2) after initiation of the flow rate increasing control operation for increasing the flow rate of gas supplied to the DPF 4 upon existence of the relatively high possibility of rapid combustion of the collected particulates detected by the ECU 7 based on the state of the DPF 4, such as the DPF temperature or the flow rate of intake air, control operation returns to the normal control operation.

A flow chart of the operation performed by the ECU 7 will be described with reference to FIG. 26. At step 1081, it is determined by the ECU 7 whether the relatively high possibility of rapid combustion of the collected particulates exists. When it is determined that the relatively high possibility of rapid combustion of the collected particulates exists at step 1081, control proceeds to step 1082. When "NO" is returned at step 1081, control repeats step 1081. At step 1082, the flow rate increasing control operation for increasing the flow rate of gas supplied to the DPF 4 is performed.

Next, at step 1083, it is determined whether the DPF inlet-outlet gas temperature difference is equal to or less then the threshold value ΔT2. When it is determined that the DPF inlet-outlet gas temperature difference is equal to or less than the threshold value ΔT2 at step 1083, control proceeds to step 1084. When "NO" is returned at step 1083, control repeats step 1083. At step 1084, the flow rate increasing control operation for increasing the flow rate of gas supplied to the DPF 4 is stopped.

(Twentieth Embodiment)

Figure 27:
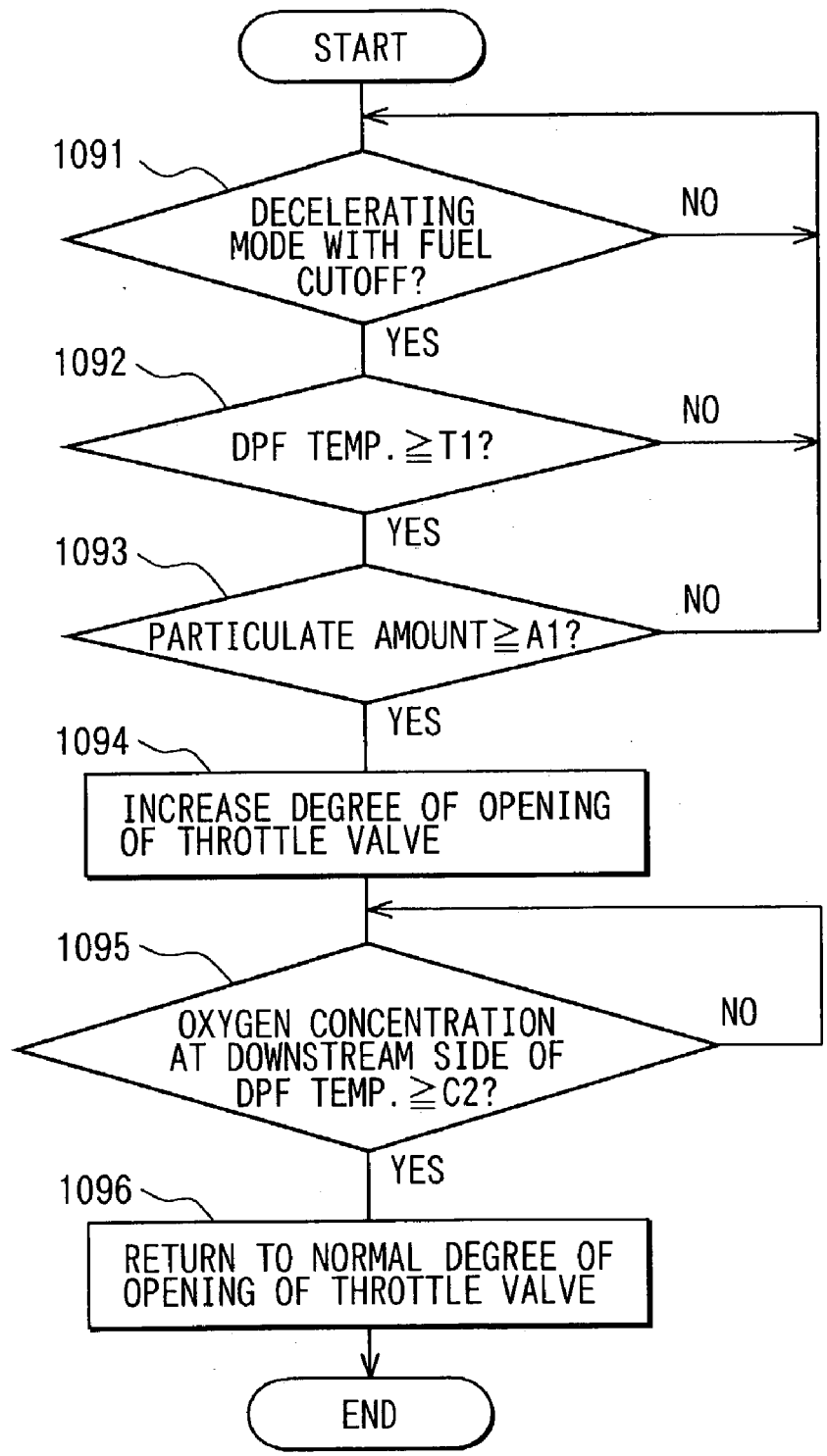
FIG. 27 is a flow chart showing control operation of the ECU of the exhaust gas filtering system according to a twentieth embodiment of the present invention.

A twentieth embodiment of the present invention will be described with reference to FIG. 27. A structure of an exhaust gas filtering system according to the twentieth embodiment is substantially the same as that of the first embodiment and thus will not be depicted. In the present embodiment, when the oxygen concentration at the downstream side of the DPF 4 measured with the A/F sensor 42 begins to increase, more specifically, when the oxygen concentration at the downstream side of the DPF 4 becomes equal to or greater than a non-combustible state threshold value C2 (C1<C2) after initiation of the flow rate increasing control operation for increasing the flow rate of gas supplied to the DPF 4 upon existence of the relatively high possibility of rapid combustion of the collected particulates detected by the ECU 7 based on the operating state of the engine 1, control operation returns to the normal control operation.

A flow chart of the operation performed by the ECU 7 will be described with reference to FIG. 27. At step 1091, it is determined by the ECU 7 whether the engine 1 is in the decelerating operating mode that involves fuel cutoff. When it is determined that the engine 1 is in the decelerating operating mode that involves fuel cutoff at step 1091, control proceeds to step 1092. At step 1092, it is determined whether the temperature of the DPF 4 is equal to or greater than the threshold value T1. When it is determined that the temperature of the DPF 4 is equal to or greater than the threshold value T1 at step 1092, control proceeds to step 1093. At step 1093, it is determined whether the collected particulate amount of the DPF 4 is equal to or greater than the threshold value A1. When it is determined that the collected particulate amount of the DPF 4 is equal to or greater than the threshold value A1 at step 1093, control proceeds to step 1094. When "NO" is returned at any of steps 1091, 1092, 1093, control returns to "START" in FIG. 27.

At step 1094, the degree of opening of the throttle valve 22 is increased relative to the normal degree of opening of the throttle valve 22 to increase the flow rate of gas supplied to the DPF 4 and thereby to decrease the temperature of the DPF 4. Next, control proceeds to step 1095 where it is determined whether the oxygen concentration at the downstream side of the DPF 4 is equal to or greater than a predetermined concentration (non-combustible state threshold value C2), which does not likely cause the rapid combustion of the collected particulates. When it is determined that the oxygen concentration at the downstream side of the DPF 4 is equal to or greater than the threshold value C2 at step 1095, control proceeds to step 1096. At step 1096, the degree of opening of the throttle valve 22 is returned to the normal degree of opening of the throttle valve 22, and the current flow ends. By controlling the degree of opening of the throttle valve 22 based on the oxygen concentration at the downstream side of the DPF 4 in the manner described above, more efficient and safer control operation is possible.

(Twenty-First Embodiment)

Figure 28:
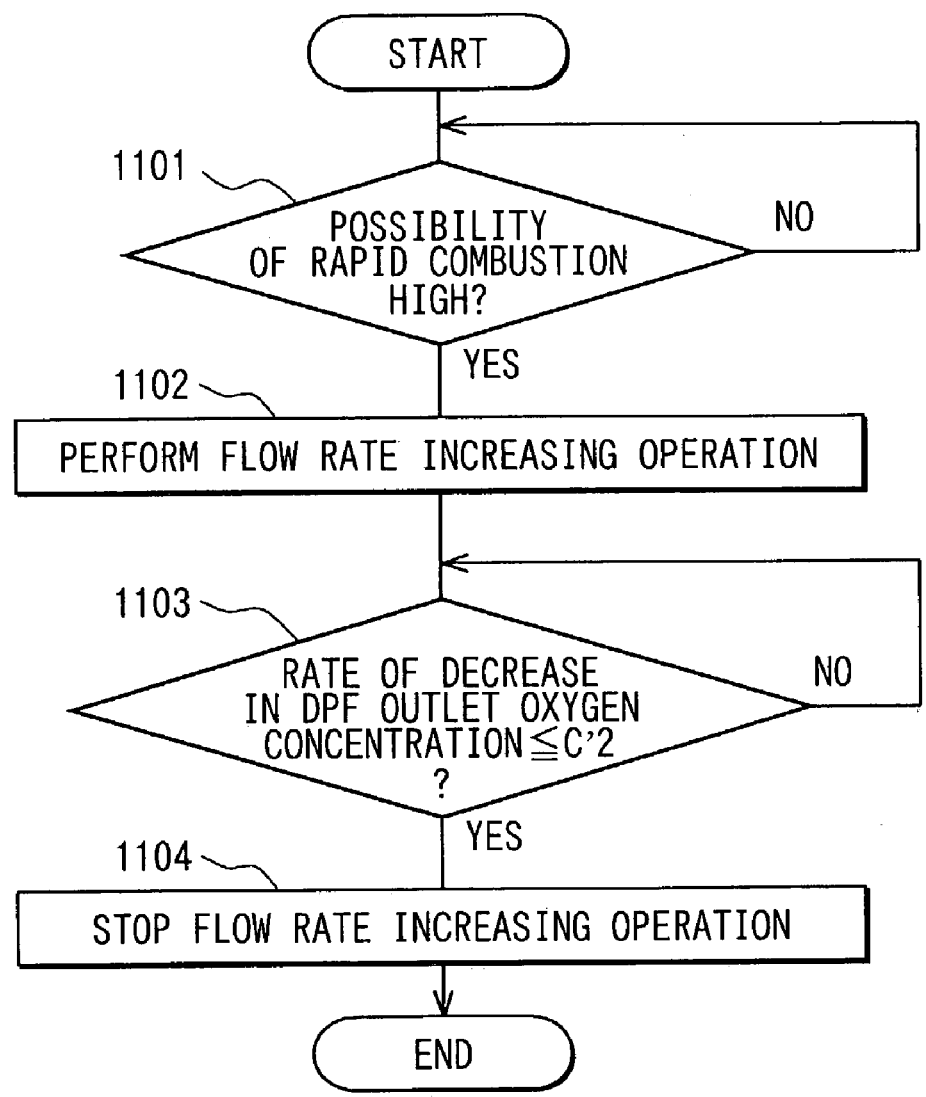
FIG. 28 is a flow chart showing control operation of the ECU of the exhaust gas filtering system according to a twenty-first embodiment of the present invention.

A twenty-first embodiment of the present invention will be described with reference to FIG. 28. A structure of an exhaust gas filtering system according to the twenty-first embodiment is substantially the same as that of FIG. 1 and thus will not be depicted. In the present embodiment, when decrease in the DPF outlet oxygen concentration is alleviated, more specifically, when the rate of decrease in the DPF outlet oxygen concentration becomes equal to or less than a non-combustible state threshold value C'2 (C'1>C'2) after initiation of the flow rate increasing control operation for increasing the flow rate of gas supplied to the DPF 4 upon existence of the relatively high possibility of rapid combustion of the collected particulates detected by the ECU 7 based on the operating state of the DPF 4, such as the DPF temperature or the flow rate of intake air, control operation returns to the normal control operation.

A flow chart of the operation performed by the ECU 7 will be described with reference to FIG. 28. At step 1101, it is determined by the ECU 7 whether the relatively high possibility of rapid combustion of the collected particulates exists. When it is determined that the relatively high possibility of rapid combustion of the collected particulates exists, control proceeds to step 1102. When "NO" is returned at step 1101, control repeats step 1101. At step 1102, the flow rate increasing control operation for increasing the flow rate of gas supplied to the DPF 4 is performed.

At step 1103, it is determined whether the rate of decrease in the DPF outlet gas concentration is equal to or less than the threshold value C'2. When it is determined that the rate of decrease in the DPF outlet oxygen concentration is equal to or less than the threshold value C'2, control proceeds to step 1104. When "NO" is returned at step 1103, control repeats step 1103. At step 1104, the flow rate increasing control operation for increasing the flow rate of gas supplied to the DPF 4 is stopped.

(Twenty-Second Embodiment)

Figure 29:
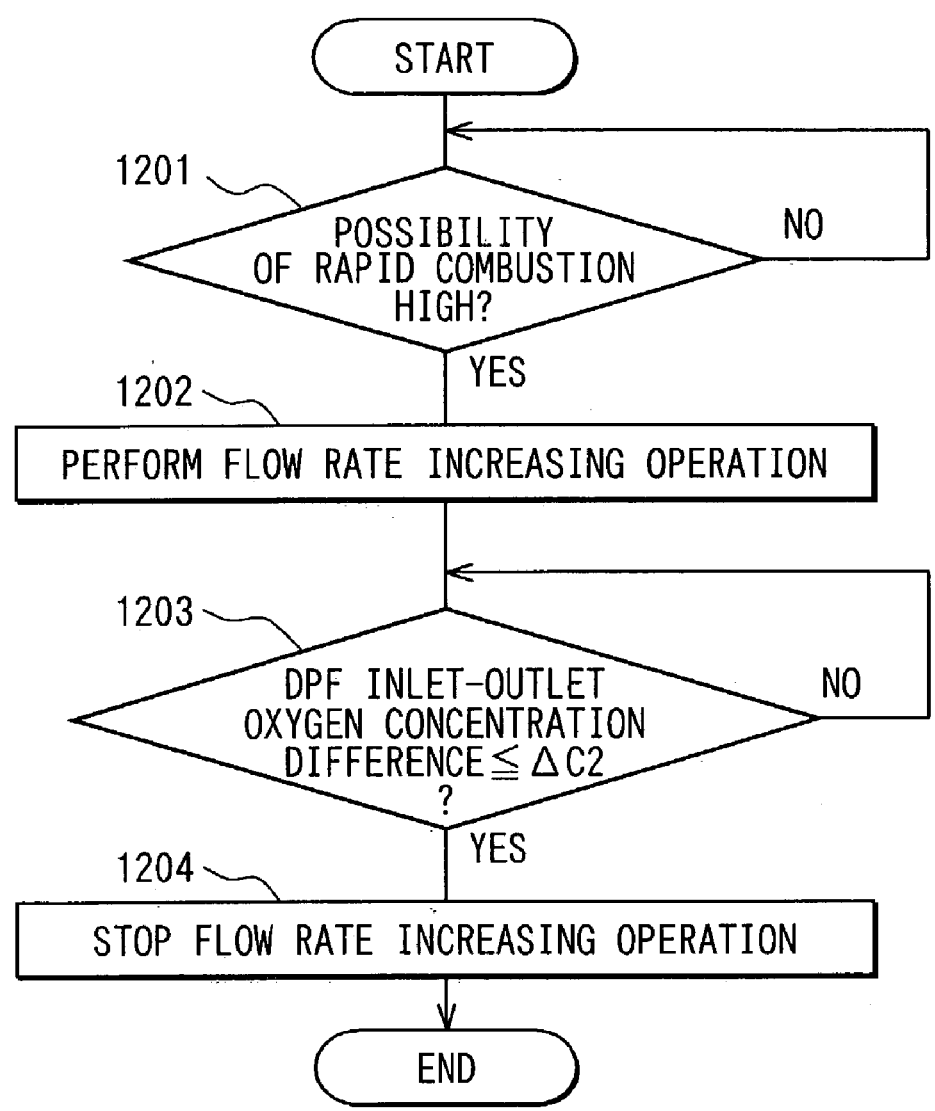
FIG. 29 is a flow chart showing control operation of the ECU of the exhaust gas filtering system according to a twenty-second embodiment of the present invention.

A twenty-second embodiment of the present invention will be described with reference to FIG. 29. A structure of an exhaust gas filtering system according to the twenty-second embodiment is substantially the same as that of FIG. 21 and thus will not be depicted. In the present embodiment, when combustion of the collected particulates in the DPF 4 is alleviated, more specifically, when the DPF inlet-outlet oxygen concentration difference becomes equal to or less than a non-combustible state threshold value ΔC2 (ΔC1>ΔC2) after initiation of the flow rate increasing control operation for increasing the flow rate of gas supplied to the DPF 4 upon existence of the relatively high possibility of rapid combustion of the collected particulates detected by the ECU 7 based on the operating state of the engine 1, control operation returns to the normal control operation.

A flow chart of the operation performed by the ECU 7 will be described with reference to FIG. 29. At step 1201, it is determined by the ECU 7 whether the relatively high possibility of rapid combustion of the collected particulates exists. When it is determined that the relatively high possibility of rapid combustion of the collected particulates exists at step 1201, control proceeds to step 1202. When "NO" is returned at step 1201, control repeats step 1201. At step 1202, the flow rate increasing control operation for increasing the flow rate of gas supplied to the DPF 4 is performed.

Next, at step 1203, it is determined whether the DPF inlet-outlet oxygen concentration difference is equal to or less than the threshold value ΔC2. When it is determined that the DPF inlet-outlet oxygen concentration difference is equal to or less than the threshold value ΔC2 at step 1203, control proceeds to step 1204. When "NO" is retuned at step 1203, control repeats step 1203. At step 1204, the flow rate increasing control operation for increasing the flow rate of gas supplied to the DPF 4 is stopped.

As described above, according to the present invention, when the relatively high possibility of rapid combustion of the collected particulates exists or when the rapid combustion of the collected particulates is initiated, the flow rate of gas supplied to the DPF 4 is positively increased. In this way, damage to the DPF 4 can be avoided. In each of the above embodiments, the particulate amount computing means of the ECU 7 computes the collected particulate amount based on the measured result of the differential pressure sensor 6, which measures the pressure difference between the upstream side of the DPF 4 and the downstream side of the DPF 4. Alternative to this, a pressure sensor, which measures the pressure at the upstream side of the DPF 4, may be provided, and the collected particulate amount may be computed based on the measured result of the pressure sensor.

The threshold values, which are used to determine existence of the relatively high possibility of rapid combustion of the collected particulates or which are used to determine the initiation of the rapid combustion of the collected particulates, do not need to be fixed and can be varied based on the operating state of the engine 1, such as the DPF temperature, engine rotational speed, the fuel injection amount or the flow rate of intake air. When the operating state of the engine 1 varies, the state of exhaust gas discharged from the engine 1 to the DPF 4 varies. Thus, the above described variation of the threshold values may be appropriate in some cases.

Additional advantages and modifications will readily occur to those skilled in the art. The invention in its broader terms is therefore not limited to the specific details described above.

What is claimed is:

1. An exhaust gas filtering system for an internal combustion engine, the exhaust gas filtering system comprising:
   a particulate filter that is inserted in an exhaust pipe of the internal combustion engine and collects particulates contained in exhaust gas supplied from the internal combustion engine through the exhaust pipe;
   a regenerating means for regenerating the particulate filter; and
   a control means for performing flow rate increasing control operation to increase a flow rate of gas supplied to the particulate filter when one of the following two conditions is satisfied:
   it is determined by the control means that rapid combustion of the collected particulates, which are collected by the particulate filter, is likely to occur based on an operating state of the internal combustion engine; and
   it is determined by the control means that rapid combustion of the collected particulates is initiated based on a state of the particulate filter.

2. An exhaust gas filtering system according to claim 1, wherein the control means determines that the rapid combustion of the collected particulates is likely to occur and thus performs the control operation to increase the flow rate of gas supplied to the particulate filter when the internal combustion engine is in a decelerating operating mode that involves fuel cutoff.

3. An exhaust gas filtering system according to claim 1, further comprising a filter temperature sensing means for sensing a temperature of the particulate filter, wherein the control means determines that the rapid combustion of the collected particulates is likely to occur and thus performs the control operation to increase the flow rate of gas supplied to the particulate filter when the temperature of the particulate filter obtained through the filter temperature sensing means is equal to or greater than a corresponding combustible state threshold value.

4. An exhaust gas filtering system according to claim 1, further comprising:
   a filter temperature sensing means for sensing a temperature of the particulate filter; and
   a particulate amount sensing means for sensing an amount of collected particulates in the particulate filter, wherein the control means determines that the rapid combustion of the collected particulates is likely to occur and thus performs the control operation to increase the flow rate of gas supplied to the particulate filter when the following conditions are all satisfied:
      the internal combustion engine is in a decelerating operating mode that involves fuel cutoff;
      the temperature of the particulate filter obtained through the filter temperature sensing means is equal to or greater than a corresponding combustible state threshold value; and
      the amount of collected particulates in the particulate filter obtained through the particulate amount sensing means is equal to or greater than a corresponding combustible state threshold value.

5. An exhaust gas filtering system according to claim 1, further comprising a filter temperature sensing means for sensing a temperature of the particulate filter, wherein the internal combustion engine is for a vehicle, and the control means determines that the rapid combustion of the collected particulates is likely to occur and thus performs the control operation to increase the flow rate of gas supplied to the particulate filter when the following conditions are all satisfied:
      the internal combustion engine is in a decelerating operating mode that involves fuel cutoff;
      the temperature of the particulate filter obtained through the filter temperature sensing means is equal to or greater than a corresponding combustible state threshold value; and
      a total driving distance of the vehicle since end of last regeneration of the particulate filter by the regenerating means is equal to or greater than a corresponding combustible state threshold value.

6. An exhaust gas filtering system according to claim 1, further comprising a filter temperature sensing means for sensing a temperature of the particulate filter, wherein the control means determines that the rapid combustion of the collected particulates is likely to occur and thus performs the control operation to increase the flow rate of gas supplied to the particulate filter when the following conditions are all satisfied:
      the internal combustion engine is in a decelerating operating mode that involves fuel cutoff;
      the temperature of the particulate filter obtained through the filter temperature sensing means is equal to or greater than a corresponding combustible state threshold value; and
      a total amount of fuel injected in the internal combustion engine since end of last regeneration of the particulate filter by the regenerating means is equal to or greater than a corresponding combustible state threshold value.

7. An exhaust gas filtering system according to claim 1, further comprising a filter temperature sensing means for sensing a temperature of the particulate filter, wherein the control means determines that the rapid combustion of the collected particulates is likely to occur and thus performs the control operation to increase the flow rate of gas supplied to the particulate filter when the following conditions are all satisfied:
      the temperature of the particulate filter obtained through the filter temperature sensing means is equal to or greater than a corresponding combustible state threshold value; and
      a flow rate of intake air of the internal combustion engine is equal to or less than a corresponding combustible state threshold value.

8. An exhaust gas filtering system according to claim 1, further comprising:
   a filter temperature sensing means for sensing a temperature of the particulate filter; and
   a particulate amount sensing means for sensing an amount of collected particulates in the particulate filter, wherein the control means determines that the rapid combustion of the collected particulates is likely to occur and thus performs the control operation to increase the flow rate of gas supplied to the particulate filter when the following conditions are all satisfied:
      the temperature of the particulate filter obtained through the filter temperature sensing means is equal to or greater than a corresponding combustible state threshold value;
      a flow rate of intake air of the internal combustion engine is equal to or less than a corresponding combustible state threshold value; and
      the amount of collected particulates in the particulate filter obtained through the particulate amount sensing means is equal to or greater than a corresponding combustible state threshold value.

9. An exhaust gas filtering system according to claim 1, further comprising a filter temperature sensing means for sensing a temperature of the particulate filter, wherein the control means determines that the rapid combustion of the collected particulates is likely to occur and thus performs the control operation to increase the flow rate of gas supplied to the particulate filter when the following conditions are all satisfied at time of cranking of the internal combustion engine:
      the temperature of the particulate filter obtained through the filter temperature sensing means at time of last engine stop of the internal combustion engine is equal to or greater than a corresponding combustible state threshold value;
      an elapsed time period since the last engine stop is equal to or less than a corresponding combustible state threshold value; and
      a flow rate of intake air of the internal combustion engine is equal to or less than a corresponding combustible state threshold value.

10. An exhaust gas filtering system according to claim 1, further comprising:
    a filter temperature sensing means for sensing a temperature of the particulate filter; and
    a particulate amount sensing means for sensing an amount of collected particulates in the particulate filter, wherein the control means determines that the rapid combustion of the collected particulates is likely to occur and thus performs the control operation to increase the flow rate of gas supplied to the particulate filter when the following conditions are all satisfied at time of cranking of the internal combustion engine:

the temperature of the particulate filter obtained through the filter temperature sensing means at time of last engine stop of the internal combustion engine is equal to or greater than a corresponding combustible state threshold value;

an elapsed time period since the last engine stop is equal to or less than a corresponding combustible state threshold value;

a flow rate of intake air of the internal combustion engine is equal to or less than a corresponding combustible state threshold value; and the amount of collected particulates in the particulate filter obtained through the particulate amount sensing means is equal to or greater than a corresponding combustible state threshold value.

11. An exhaust gas filtering system according to claim 1, further comprising a filter temperature sensing means for sensing a temperature of the particulate filter, wherein the control means determines that the rapid combustion of the collected particulates is initiated and thus performs the control operation to increase the flow rate of gas supplied to the particulate filter when the temperature of the particulate filter obtained through the filter temperature sensing means is equal to or greater than a corresponding combusting state threshold value.

12. An exhaust gas filtering system according to claim 1, further comprising a filter temperature sensing means for sensing a temperature of the particulate filter, wherein the control means determines that the rapid combustion of the collected particulates is initiated and thus performs the control operation to increase the flow rate of gas supplied to the particulate filter when the temperature of the particulate filter obtained through the filter temperature sensing means is rapidly increased.

13. An exhaust gas filtering system according to claim 12, wherein the control means determines that the rapid combustion of the collected particulates is initiated and thus performs the control operation to increase the flow rate of gas supplied to the particulate filter when a rate of increase in the temperature of the particulate filter obtained through the filter temperature sensing means is equal to or greater than a corresponding combusting state threshold value.

14. An exhaust gas filtering system according to claim 1, further comprising a filter temperature sensing means for sensing a temperature at an upstream side of the particulate filter and a temperature at a downstream side of the particulate filter, wherein the control means determines that the rapid combustion of the collected particulates is initiated and thus performs the control operation to increase the flow rate of gas supplied to the particulate filter when a temperature difference between the temperature at the upstream side of the particulate filter obtained through the filter temperature sensing means and the temperature at the downstream side of the particulate filter obtained through the filter temperature sensing means is equal to or greater than a corresponding combusting state threshold value.

15. An exhaust gas filtering system according to claim 1, further comprising an oxygen concentration sensing means for sensing an oxygen concentration at a downstream side of the particulate filter, wherein the control means determines that the rapid combustion of the collected particulates is initiated and thus performs the control operation to increase the flow rate of gas supplied to the particulate filter when the oxygen concentration at the downstream side of the particulate filter obtained through the oxygen concentration sensing means is equal to or less than a corresponding combusting state threshold value.

16. An exhaust gas filtering system according to claim 1, further comprising an oxygen concentration sensing means for sensing an oxygen concentration at a downstream side of the particulate filter, wherein the control means determines that the rapid combustion of the collected particulates is initiated and thus performs the control operation to increase the flow rate of gas supplied to the particulate filter when the oxygen concentration at the downstream side of the particulate filter obtained through the oxygen concentration sensing means is rapidly decreased.

17. An exhaust gas filtering system according to claim 16, wherein the control means determines that the rapid combustion of the collected particulates is initiated and thus performs the control operation to increase the flow rate of gas supplied to the particulate filter when a rate of decrease in the oxygen concentration at the downstream side of the particulate filter obtained through the oxygen concentration sensing means is equal to or greater than a corresponding combusting state threshold value.

18. An exhaust gas filtering system according to claim 1, further comprising an oxygen concentration sensing means for sensing an oxygen concentration at an upstream side of the particulate filter and an oxygen concentration at a downstream side of the particulate filter, wherein the control means determines that the rapid combustion of the collected particulates is initiated and thus performs the control operation to increase the flow rate of gas supplied to the particulate filter when an oxygen concentration difference between the oxygen concentration at the upstream side of the particulate filter obtained through the oxygen concentration sensing means and the oxygen concentration at the downstream side of the particulate filter obtained through the oxygen concentration sensing means is equal to or greater than a corresponding combusting state threshold value.

19. An exhaust gas filtering system according to claim 1, wherein the control means increases a degree of opening of an intake throttle valve of the internal combustion engine, which controls a flow rate of intake air of the internal combustion engine, in comparison to a normal degree of opening of the throttle valve set for a normal operating period of the exhaust gas filtering system to increase the flow rate of gas supplied to the particulate filter in the flow rate increasing control operation.

20. An exhaust gas filtering system according to claim 1, wherein the control means reduces a degree of opening of an EGR valve of the internal combustion engine, which controls a flow rate of EGR gas of the internal combustion engine, in comparison to a normal degree of opening of the EGR valve set for a normal operating period of the exhaust gas filtering system to increase the flow rate of gas supplied to the particulate filter in the flow rate increasing control operation.

21. An exhaust gas filtering system according to claim 1, wherein the control means increases a degree of opening of an intake throttle valve of the internal combustion engine, which controls a flow rate of intake air of the internal combustion engine, in comparison to a normal degree of opening of the throttle valve set for a normal operating period of the exhaust gas filtering system and also reduces a degree of opening of an EGR valve of the internal combustion engine, which controls a flow rate of EGR gas of the internal combustion engine, in comparison to a normal degree of opening of the EGR valve set for the normal operating period of the exhaust gas filtering system to increase the flow rate of gas supplied to the particulate filter in the flow rate increasing control operation.

22. An exhaust gas filtering system according to claim 1, wherein the control means shifts a rotational speed of the internal combustion engine to a higher level, which is increasingly offset from a corresponding normal rotational speed of the internal combustion engine set for a normal operating period of the exhaust gas filtering system, to increase the flow rate of gas supplied to the particulate filter in the flow rate increasing control operation when a clutch, which connects and disconnects between the internal combustion engine and a load of the internal combustion engine, is disengaged to disconnect between the internal combustion engine and the load of the internal combustion engine.

23. An exhaust gas filtering system according to claim 22, wherein the control means gradually changes the rotational speed of the internal combustion engine to a disengaged state offset rotational speed of the internal combustion engine, which is offset from a disengaged state normal rotational speed of the internal combustion engine set for a completely disengaged normal state of the clutch, at a rate slower than that of the normal operating period of the exhaust gas filtering system when the clutch is disengaged in the flow rate increasing control operation.

24. An exhaust gas filtering system according to claim 23, wherein the control means changes the rate at least once to a lower level after initiation of the disengagement of the clutch before the rotational speed of the internal combustion engine reaches the disengaged state offset rotational speed in the flow rate increasing control operation.

25. An exhaust gas filtering system according to claim 1, further comprising an air supplying means for supplying air to the particulate filter from an upstream side of the particulate filter, wherein the control means activates the air supplying means to increase the flow rate of gas supplied to the particulate filter in the flow rate increasing control operation.

26. An exhaust gas filtering system according to claim 1, wherein the control means stops the flow rate increasing control operation and returns to a normal control operation after initiating the flow rate increasing control operation when one of the following conditions is satisfied:

it is determined by the control means that the rapid combustion of the collected particulates, which are collected by the particulate filter, is no longer likely to occur; and it is determined by the control means that the rapid combustion of the collected particulates is stopped.

27. An exhaust gas filtering system according to claim 26, further comprising a filter temperature sensing means for sensing a temperature of the particulate filter, wherein when the temperature of the particulate filter obtained through the filter temperature sensing means begins to decrease, then one of the following conditions is satisfied:

it is determined by the control means that the rapid combustion of the collected particulates, which are collected by the particulate filter, is no longer likely to occur; and it is determined by the control means that the rapid combustion of the collected particulates is stopped.

28. An exhaust gas filtering system according to claim 26, further comprising a filter temperature sensing means for sensing a temperature of the particulate filter, wherein when the temperature of the particulate filter obtained through the filter temperature sensing means is equal to or less than a corresponding non-combustible state threshold value, then one of the following conditions is satisfied:

it is determined by the control means that the rapid combustion of the collected particulates, which are collected by the particulate filter, is no longer likely to occur; and it is determined by the control means that the rapid combustion of the collected particulates is stopped.

29. An exhaust gas filtering system according to claim 26, further comprising a filter temperature sensing means for sensing a temperature of the particulate filter, wherein when a rate of increase in the temperature of the particulate filter obtained through the filter temperature sensing means is equal to or less than a corresponding non-combustible state threshold value, then one of the following conditions is satisfied:

it is determined by the control means that the rapid combustion of the collected particulates, which are collected by the particulate filter, is no longer likely to occur; and it is determined by the control means that the rapid combustion of the collected particulates is stopped.

30. An exhaust gas filtering system according to claim 26, further comprising a filter temperature sensing means for sensing a temperature at an upstream side of the particulate filter and a temperature at a downstream side of the particulate filter, wherein when a temperature difference between the temperature at the upstream side of the particulate filter obtained through the filter temperature sensing means and the temperature at the downstream side of the particulate filter obtained through the filter temperature sensing means is equal to or less than a corresponding non-combustible state threshold value, then one of the following conditions is satisfied:

it is determined by the control means that the rapid combustion of the collected particulates, which are collected by the particulate filter, is no longer likely to occur; and it is determined by the control means that the rapid combustion of the collected particulates is stopped.

31. An exhaust gas filtering system according to claim 26, further comprising an oxygen concentration sensing means for sensing an oxygen concentration at a downstream side of the particulate filter, wherein when the oxygen concentration at the downstream side of the particulate filter obtained through the oxygen concentration sensing means begins to increase, then one of the following conditions is satisfied:

it is determined by the control means that the rapid combustion of the collected particulates, which are collected by the particulate filter, is no longer likely to occur; and it is determined by the control means that the rapid combustion of the collected particulates is stopped.

32. An exhaust gas filtering system according to claim 26, further comprising an oxygen concentration sensing means for sensing an oxygen concentration at a downstream side of the particulate filter, wherein when the oxygen concentration at the downstream side of the particulate filter obtained through the oxygen concentration sensing means is equal to or greater than a corresponding non-combustible state threshold value, then one of the following conditions is satisfied:

it is determined by the control means that the rapid combustion of the collected particulates, which are collected by the particulate filter, is no longer likely to occur; and it is determined by the control means that the rapid combustion of the collected particulates is stopped.

33. An exhaust gas filtering system according to claim 26, further comprising an oxygen concentration sensing means for sensing an oxygen concentration at a downstream side of the particulate filter, wherein when a rate of decrease in the oxygen concentration at the downstream side of the particulate filter obtained through the oxygen concentration sensing means is equal to or less than a corresponding non-combustible state threshold value, then one of the following conditions is satisfied:

it is determined by the control means that the rapid combustion of the collected particulates, which are collected by the particulate filter, is no longer likely to occur; and it is determined by the control means that the rapid combustion of the collected particulates is stopped.

34. An exhaust gas filtering system according to claim 26, further comprising an oxygen concentration sensing means for sensing an oxygen concentration at an upstream side of the particulate filter and an oxygen concentration at a downstream side of the particulate filter, wherein when an oxygen concentration difference between the oxygen concentration at the upstream side of the particulate filter obtained through the oxygen concentration sensing means and the oxygen concentration at the downstream side of the particulate filter obtained through the oxygen concentration sensing means is equal to or less than a corresponding non-combustible state threshold value, then one of the following conditions is satisfied:

it is determined by the control means that the rapid combustion of the collected particulates, which are collected by the particulate filter, is no longer likely to occur; and it is determined by the control means that the rapid combustion of the collected particulates is stopped.

35. An exhaust gas filtering system according to claim 1, further comprising:

a filter temperature sensing means for sensing a temperature of the particulate filter; and a particulate amount sensing means for sensing an amount of collected particulates in the particulate filter, wherein the control means determines that the rapid combustion of the collected particulates is likely to occur and thus performs the control operation to increase the flow rate of gas supplied to the particulate filter when the following conditions are all satisfied:

an oxygen concentration in exhaust gas, which is supplied to the particulate filter, is equal to or greater than a predetermined value to achieve a relatively high oxygen concentration due to a fuel cutoff operation of the internal combustion engine;

the temperature of the particulate filter obtained through the filter temperature sensing means is equal to or greater than a corresponding combustible state threshold value; and the amount of collected particulates in the particulate filter obtained through the particulate amount sensing means is equal to or greater than a corresponding combustible state threshold value.

* * * * *